United States Patent
Howard et al.

(10) Patent No.: US 7,836,389 B2
(45) Date of Patent: Nov. 16, 2010

(54) EDITING SYSTEM FOR AUDIOVISUAL WORKS AND CORRESPONDING TEXT FOR TELEVISION NEWS

(75) Inventors: Johnathon E. Howard, Amesbury, MA (US); Roy L. Procops, Wellesley, MA (US); Daniel Freedman, Boston, MA (US); Christopher M. Thomas, Haverhill, MA (US); Carlos W. Smith, Medford, MA (US)

(73) Assignee: Avid Technology, Inc., Burlington, MA (US)

( * ) Notice: Subject to any disclaimer, the term of this patent is extended or adjusted under 35 U.S.C. 154(b) by 807 days.

(21) Appl. No.: 11/106,278

(22) Filed: Apr. 13, 2005

(65) Prior Publication Data

US 2007/0260968 A1    Nov. 8, 2007

Related U.S. Application Data

(63) Continuation-in-part of application No. 11/086,149, filed on Mar. 22, 2005.

(60) Provisional application No. 60/562,925, filed on Apr. 16, 2004.

(51) Int. Cl.
G06F 17/00 (2006.01)
(52) U.S. Cl. ...................................................... 715/202
(58) Field of Classification Search ................. 715/201, 715/202, 204, 203
See application file for complete search history.

(56) References Cited

U.S. PATENT DOCUMENTS

| | | | | |
|---|---|---|---|---|
| 4,685,797 A | * | 8/1987 | Ito | ................................ 399/85 |
| 5,801,685 A | | 9/1998 | Miller et al. | |
| 5,852,435 A | * | 12/1998 | Vigneaux et al. | ............. 345/428 |
| 5,940,401 A | * | 8/1999 | Frazier et al. | ................ 370/445 |
| 6,038,573 A | | 3/2000 | Parks | |

(Continued)

FOREIGN PATENT DOCUMENTS

GB    2336025    6/1999

(Continued)

OTHER PUBLICATIONS

Hsu et al., A Statistical Framework for Fusing Mid-Level Perceptual Features in News Stories Segmentation, IEEE 2003, pp. 413-416.*

(Continued)

*Primary Examiner*—Cong-Lac Huynh
(74) *Attorney, Agent, or Firm*—Oliver Strimpel

(57) ABSTRACT

An audiovisual editing system that permits a journalist and other editors to edit both audiovisual and corresponding text segments included in a story. The data structure representing a story includes a list of media segments and a list of corresponding text segments. Each media segment has a type, such as script, SOT and voice, and includes a list of video clips. Each SOT segment or voice segment includes a list of timing control elements that determine the length of a media segment. The difference in the duration of the audiovisual material and the duration of the related text may be displayed to the editor, making it easier for the editor to match video to a script. Similarly, the duration of voice and SOT clips can be displayed to the editor, making it easier for the editor to match the video to the audio.

23 Claims, 12 Drawing Sheets

U.S. PATENT DOCUMENTS

| | | | |
|---|---|---|---|
| 6,043,897 A * | 3/2000 | Morikawa et al. | 358/1.14 |
| 6,404,978 B1 | 6/2002 | Abe | |
| 6,845,485 B1 * | 1/2005 | Shastri et al. | 715/203 |
| 6,873,689 B1 * | 3/2005 | Butler et al. | 379/93.05 |
| 6,912,688 B1 * | 6/2005 | Zhou et al. | 715/202 |
| 2002/0056097 A1 * | 5/2002 | Marion et al. | 725/38 |
| 2002/0069217 A1 * | 6/2002 | Chen et al. | 707/500.1 |
| 2003/0081581 A1 * | 5/2003 | Clark et al. | 370/338 |
| 2003/0088877 A1 * | 5/2003 | Loveman et al. | 725/92 |
| 2003/0091970 A1 * | 5/2003 | Fast et al. | 434/322 |
| 2003/0107478 A1 * | 6/2003 | Hendricks et al. | 340/311.2 |
| 2003/0167449 A1 * | 9/2003 | Warren et al. | 715/531 |
| 2003/0198339 A1 * | 10/2003 | Roy et al. | 379/387.01 |
| 2003/0220705 A1 * | 11/2003 | Ibey | 700/94 |
| 2004/0027369 A1 * | 2/2004 | Kellock et al. | 345/716 |
| 2004/0083433 A1 * | 4/2004 | Takeya | 715/530 |
| 2004/0097254 A1 * | 5/2004 | Laroia et al. | 455/522 |
| 2004/0165472 A1 * | 8/2004 | Yamazaki | 365/233 |
| 2005/0235198 A1 * | 10/2005 | Howard et al. | 715/500.1 |
| 2006/0179403 A1 * | 8/2006 | Kirkpatrick | 715/501.1 |
| 2007/0101394 A1 * | 5/2007 | Fu et al. | 725/134 |
| 2007/0204319 A1 * | 8/2007 | Ahmad et al. | 725/134 |
| 2008/0010585 A1 * | 1/2008 | Schneider et al. | 715/201 |
| 2008/0137685 A1 * | 6/2008 | Gunaseelan et al. | 370/468 |

FOREIGN PATENT DOCUMENTS

| | | |
|---|---|---|
| JP | 2005-074109 | 3/1993 |

OTHER PUBLICATIONS

Hauptmann et al., Informedia: News-on-Demand Multimedia Information Acquisition and Retrieval, Intelligent Multimedia Information Retrieval, Google Search 1997, pp. 1-21.*

Paul, Audio Prototyping with Pure Data, Google May 28, 2003, pp. 1-7.*

Syeda-Mahmood et al., Learning Video Browsing Behavior and Its Application in the Generation of Video Previews, ACM 2001, pp. 119-128.*

Liu et al., Adaptive Delay Concealment for Internet Voice Application with Packet-based Time-Scale Modification, Google 2001, pp. 1-4.*

Non-Final Office Action dated Jun. 1, 2009, in U.S. Appl. No. 11/086,149, Johnathon E. Howard, with references cited by the Examiner.

Shin-Ywan Wang and Yagasaki, T., "Block Selection: a method for segmenting a page image of various editing styles", vol. 1, 14-16, Aug. 1995, pp. 128-133.

* cited by examiner

EDITING SYSTEM FOR AUDIOVISUAL WORKS AND CORRESPONDING TEXT FOR TELEVISION NEWS

CROSS-REFERENCE TO RELATED APPLICATIONS

This application in a nonprovisional patent application that claims priority and the benefits under 35 U.S.C. 119 to provisional patent application 60/562,925, filed Apr. 16, 2004. This application also claims priority and the benefits under 35 U.S.C. 120 to, and is a continuation-in-part of, U.S. patent application Ser. No. 11/086,149, filed Mar. 22, 2005, now pending, which is hereby incorporated by reference.

BACKGROUND

In television news, a story is developed in two parts.

First, there is the audiovisual portion that includes video that is displayed on the television, and corresponding audio, if any. Recorded video without sound is typically referred to as "B-roll." If the recorded video has associated sound, that sound is referred to as natural sound ("NAT") or sound on tape ("SOT"). SOT typically is recorded from a microphone placed on or near a person that is talking. NAT typically is recorded from a microphone placed on the video camera and records background sound. Studio recorded sound, typically a voice—over ("VO" or "voice"), also may be combined with the video. The journalist usually identifies audiovisual materials that are desired for the story by taking written notes. The journalist also usually meets with an editor who prepares the audiovisual materials into a final work using a nonlinear editing system.

Second, a newscaster typically reads copy written by a journalist that corresponds to the audiovisual materials. It is important for the journalist to ensure that the copy, when read, is not longer or much shorter than the audiovisual materials to which it corresponds.

SUMMARY

To address such needs of journalists and other editors, an audiovisual editing system associates segments of audiovisual materials with segments of related text. The editing system permits an editor to edit both the audiovisual materials of the segments and to edit the related text.

The data structure representing the story includes a list of media segments and a list a text segments and a correspondence among the segments. Each media segment has a type, such as script, SOT and voice, and includes a list of video clips. SOT and voice segments each include a list of timing control elements. Timing control elements in SOT segments may be SOT clips and pause elements (a specified period of silence). Timing control elements in voice segments may be voice clips and pause elements. A script segment may be converted to a SOT or voice segment by adding a SOT clip or voice clip to it. Video clips can be set to be automatically trimmed to fit the length of the media segment to which they are attached. This length can be determined by either timing control elements or script text associated with a corresponding text segment.

These data structures enable the editing system to provide a simple and intuitive interface for editing a story. In particular, a story can be laid out as a vertical timeline which media segments and corresponding text segments displayed adjacent to each other. Different types of segments are displayed with different colors. A user can extend clips from one segment into another, split segments and create L-cuts. A user can designate a clip to be automatically trimmed to fit the length of the media segment to which it is attached.

These data structures also can be transformed in a straightforward manner into a conventional, multitrack sequence used to represent an audiovisual composition. Each clip in each segment is transformed into a span on a track. Spans on NAT and SOT tracks are automatically created for video clips that specify that their NAT and SOT audio are to be used. Spans on video tracks are automatically created for SOT clips where the video track is otherwise empty.

Because the editing system provides several types of segments, including B-roll segments, SOT segments and voice segments, the user selects media and a segment type to places media at a desired location in the story. This selection by the user may be enabled by an overlay menu on a video viewer window in the user interface. The editing system automatically defines parameters, such as designating the correct audio tracks, which minimize the chance for errors and speeds the workflow. Automatic ducking of these tracks also can be provided.

A research pane is provided in the user interface to display browsing and searching results. Tabbed cards can be used to display results from different browsing and searching operations. Cards can be pinned so that when new results are available they are displayed in another card, so as to preserve the results displayed in a pinned card.

The various sections of the user interface may be arranged and sized relative to each other in any manner, except that they are pinned together to avoid overlap. This capability permits the user to size the interface for different types of computer displays, including workstation monitors that are used in a portrait, or vertical, mode (in which the height of the display is longer than its width) instead of a landscape, or horizontal mode.

An estimated time for reading the related text aloud by the newscaster is determined. This estimated time for reading the text related a script segment may be compared to the actual duration of the audiovisual material of the script segment. The difference in the duration of the audiovisual material and the duration of the related text may be displayed to the editor, making it easier for the editor to match video to a script. Similarly, the duration of voice and SOT clips can be compared to the duration of video clips in a media segment. The difference in the duration of the video clips and the voice and SOT clips may be displayed to the editor, making it easier for the editor to match the video to the audio.

Also, any position in the text for a segment may be mapped to a corresponding position in time in the audiovisual material for the segment, and this position may be indicated to the editor. Additionally, in response to edits of the related text of a segment, a corresponding editing operation can be automatically performed on the reference to the audiovisual information of the segment.

The editing system also can be provided with a function that will send the story and a sequence generated from it to the playback system to transmit the completed story to air, thus improving turnaround time for breaking news.

Stories can be stored as text documents in a markup language. Data representing the audiovisual segments can be embedded in these stories. Thus, if such a document contains a story that has no associated audiovisual segments, its script also can be imported by the editing system to create an initial story of script segments with no corresponding video. This operation can be invoked given a script as an input. At each break in the script, as may be designated by any of a number of delimiters, a new text segment is created. The text from the script is extracted and added to the text segment. If such a document contains the story along with the data structures representing the media segments for the story, the editing system can recreate the set of media segments and text segments from the document. Also, other systems can read and process the data structures represented in the document to create a sequence. Also, in a text editor, the document may be modified, and the segments of the story can be rearranged.

The editing system may be interconnected through a computer network in a newsroom to a variety of other systems including an asset management system, shared storage for media and a story database. These systems also may be connected to yet other editing systems. By having the editing system store stories in the story database and sequences in the asset management system, both sequences and stories are made available to other editing systems.

These and other capabilities of the editing system, as described below, help a journalist to edit an audiovisual story through editing operations performed primarily on the script, copy or text that is being prepared by the journalist.

DETAILED DESCRIPTION

Figure 1:
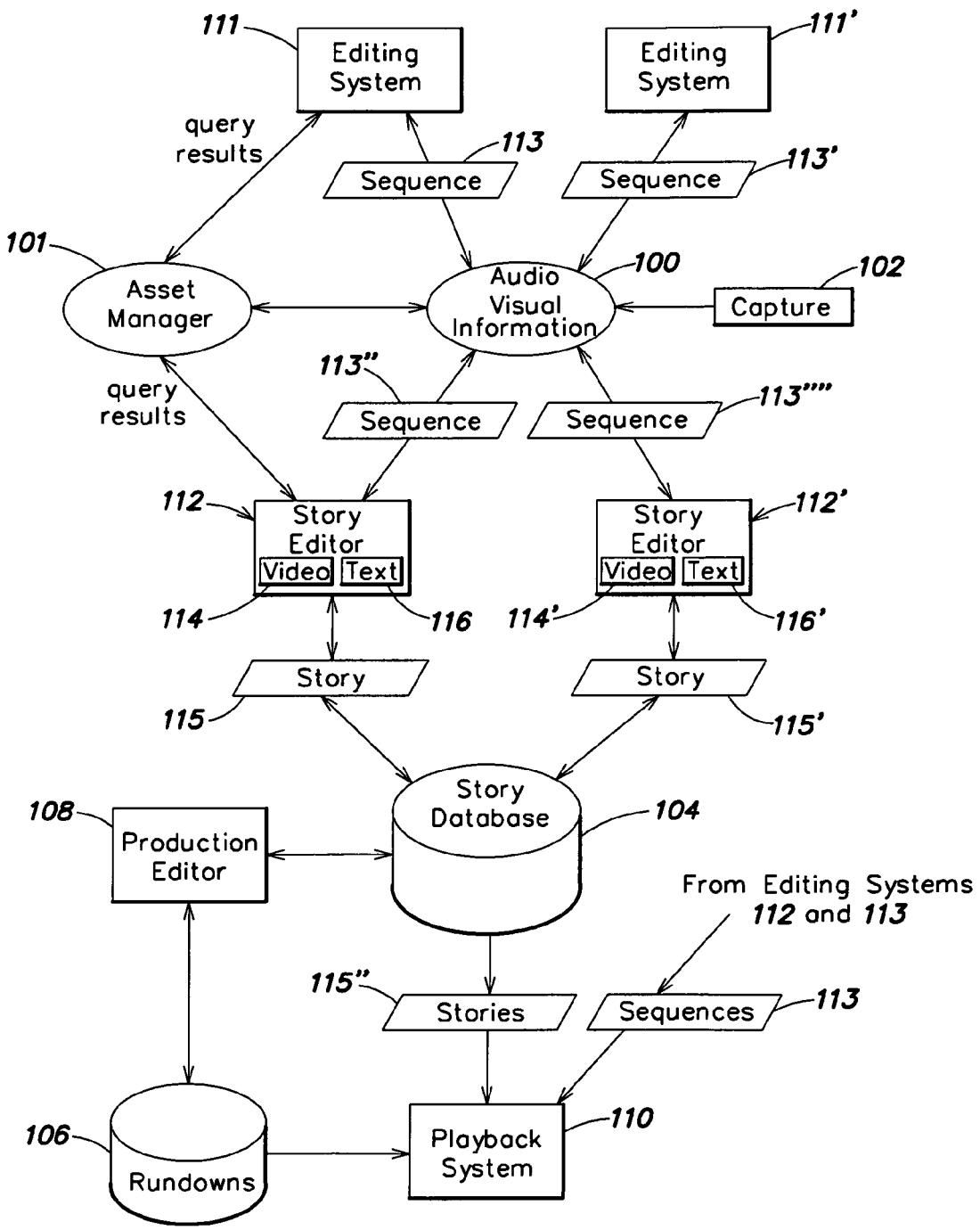
FIG. 1 is a diagram of an example newsroom system including an editing system.

Referring now to FIG. 1, an example newsroom system including an editing system will now be described. This example newsroom system includes a source 100 of stored audiovisual information. This source 100 may include one or more computer-readable data storage devices, typically randomly-accessible, in which video and audio data in digital form may be stored in computer-readable data files. Audio and video data for a clip may be stored in the same file or in separate files. The audio and video data may be in any of a number of formats. The audio and video data typically is stored in such storage devices through a capture system 102. The stored audiovisual information also may include sequences or clips, that define portions of the audio and/or video data using references, whether direct or indirect, to the audio and video data files and specified portions of the audio and video data stored in those files. The stored audiovisual information also may include compositions, which are combinations of sequences or clips. Such compositions may be stored in any of a number of different formats used by non-linear editing systems, often referred to as a sequence, such as the Advanced Authoring Format (AAF), the Open Media Framework (OMF), the Material eXchange Format (MXF), QuickTime, edit decision list or other format. The source 100 of stored audiovisual information may include a server that permits access to stored audio and video files, to permit the source 100 to be shared among multiple editing systems or other systems that may use stored audiovisual material. It also may have an associated asset management system 101 that maintains a searchable database of descriptive information about media assets, both video and audio, including sequences.

Storage 104, such as a story database, also is provided for stories. Such a story database may be implemented using a newsroom computer system such as the Avid iNews system. Stories include the text that will be read by a newscaster, optional machine control information, and one or more references to audiovisual information. A story may be represented, for example, in the News Story Markup Language described in U.S. Pat. No. 6,596,031, which is hereby incorporated by reference. A production editor 108 accesses stories and places them in a rundown 106, which represents the sequence of the stories to be played back by a playback system 110. The playback system 110 accesses the text of the stories 115 to provide it to, for example, a teleprompter and/or a machine control system. The playback system 110 also accesses and plays back the audiovisual information for corresponding sequences 113 from editing systems 111 and 112, combined with other information, such as closed-captioning and/or the newscaster's voice (who reads the related text being displayed on the teleprompter).

One or more editing systems 112 enable individuals to view and edit compositions 113 of audiovisual information and associated stories 115. The editing system 112 thus contains a video viewer and facilities for editing video 114 and facilities for editing text 116, to be described in more detail below. This editing system 112 associates segments of audiovisual materials with segments of related text. The editing system permits an editor to edit both the audiovisual materials of the segments and the related text.

As will be described in more detail below, the story 115 created using an editing system 112 can be stored in storage 104. At the same time, the composition 113 of audiovisual materials created using the editing system 112 can be stored in the source 100 of audiovisual information and indexed by the asset management system 101. A representation of such a composition may be embedded in the story 115 stored in storage 104. In this manner, other editors using other editing systems 112 can access a story stored in storage 104 and continue editing that story, including its corresponding composition. Also the editing system 112 can be provided with a function that will send the composition 113 and the story 115 to the playback system to transmit the completed story to air, thus improving turnaround time for breaking news.

Other editing systems, such as editing systems 111 that work with compositions, can access and edit the composition 113. Such editing systems 111 also can access a story from storage 104 and build the composition 113 from the information embedded in the story 115. These editing systems 111 typically are used to finish the composition by refining the edits on the segments, adding and refining transitions, adding and refining effects, titles, color correction and graphics, and otherwise performing other editing operations. Finished compositions or sequences also may be stored in the storage 100 and provided to the playback system 110.

The editing system 112 will now be described in more detail. It should be understood that the editing system 112 need not be in a networked newsroom system as shown in FIG. 1 if the editing system otherwise has access to audiovisual information which can be added to a story. Stories generated by the editing system 112 can be output as stories in a text format or the editing system 112 can output a sequence. It also should be understood that the editing system 112 is not limited to generating news stories. Any audiovisual work can be created using such an editing system. For example, such an editing system could be used in post-production to generate a rough cut of a movie or television show.

Figure 2:
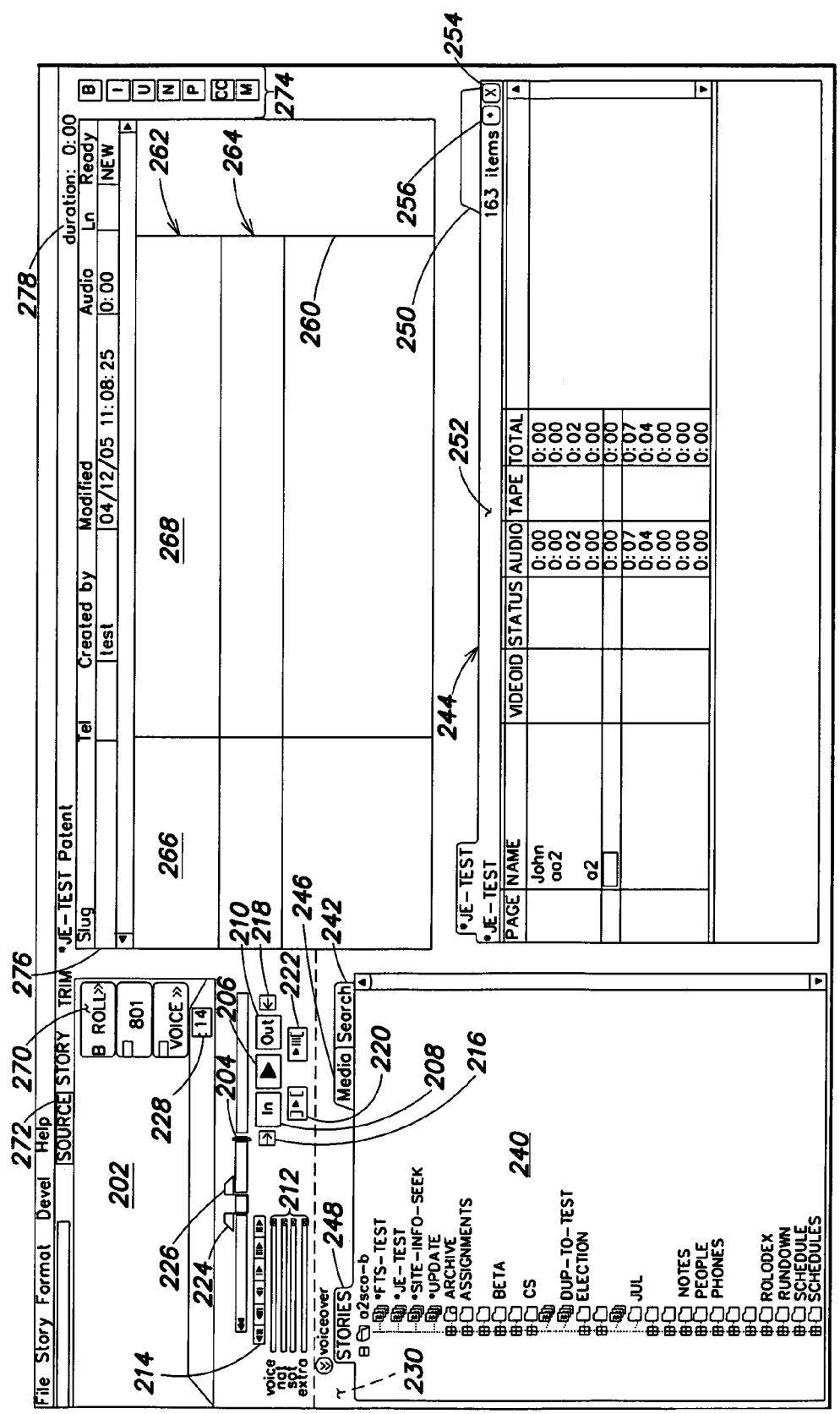
FIG. 2 is a diagram of an example user interface for the editing system in FIG. 1.

FIG. 2 is a diagram of an example user interface for the editing system 112. In this interface 200, a video viewer 202 is provided. The viewer displays either a selected frame of a clip of video (based on the position of a position bar 204), or plays back the clip of video. The viewer may include conventional navigation buttons, such as a play button 206. Other buttons (not shown) may be provided for pause, stop, fast forward, and rewind. Editing buttons, such as for marking mark in 208 and mark out 210 locations (start and stop points) of a clip, also may be provided. The duration of the clip shown in the viewer window also is shown at 228. Trim handles 224 and 226 permit a user to set and modify in and out points. Audio levels for different audio tracks in a composition or in source material are shown at 212. Frame advance controls for moving the position bar forward or backward one or more frames are provided at 214. Other controls include a go to mark in button 216, go to mark out button 218, play from mark in to mark out button 220 and a review out point button 222. Above the viewer window is a mode indicator 272. When the viewer window is displaying source material, the source mode indicator is highlighted. When the viewer window is displaying a selected clip from the story, the story mode indicator is highlighted. When the viewer window is display a selected clip from the story that is undergoing a trim operation the trim mode indicator is highlighted, A voiceover control section 230 may be provided. It may be hidden (as in FIG. 2) or revealed (as in FIG. 8). When revealed (see FIG. 8), the voiceover control section 230 displays a start and stop button 232, a level indicator 234 and a drop down menu 236 for source selection.

The interface 200 also may include a searching and browsing interface 240. By selecting a search tab 242 (also shown in FIG. 4), a user may query any media assets that are accessible by the editor such as through a media asset manager. Query results may be shown in interface 244. By selecting the media tab 246 (also shown in FIG. 8), a user may browse any media assets that are accessible through another database, file system or other storage, such as the shared storage system. Contents of any currently selected folder may be displayed in the interface 244. By selecting the stories tab 248, a user may browse stories and rundowns that are in the story database. Contents of any currently selected folder or query results from the story database may be displayed in the interface 244. Thus, the various media assets that may be searched or browsed include stories, media files, compositions, or rundowns of stories.

The interface 244 may be called a research pane and displays results of searches or browsing operations performed on the various sources of media assets. The research pane is a tabbed area for displaying source material. The source material includes stories and media assets. The material can be found by opening a folder (also called a queue or rundown in a story database or a bin in a media asset management system or shared media storage). Also, material can be found by a search. Each different result from browsing or searching may have its own card in the research pane. Each card has a tab 250 and a content area 252 which displays the information. The content area of only one active card is shown at any given time. All of the tabs are made accessible for a user to select. To change the active card, a user selects the tab for that card, and then the content area for the card is displayed. A card may contain a close button 254, and clicking the button closes the card.

Tabs for each card in the research pane also may have a pin indicator 2 56, indicating whether the tab has been pinned, and a search in progress indicator (258 in FIG. 4), indicating whether a search that is generating results for the card is still in progress. The pin indicator can be implemented as a standard bistate button, with the exceptions that clicking has no effect when the card is pinned and the button has no disabled state. Thus, a card that is pinned cannot be unpinned and clicking on an unpinned card changes it to a pinned card. By the card opening rules described below, pinning a card means that the card will not be reused when other content of the same type is to be displayed.

Whether a card is pinned affects how other cards are opened for new browsing and search results. In particular, when the user requests that some content be displayed in the research pane, the following rules are used to display a card with that content. First, if a card already exists that contains the requested content, then that card is brought to the front (i.e., made the active card) if that card is not already in front. If there is an unpinned card containing the same type of content as the requested content, then that card's content is replaced with the requested content and that card is brought to the front if not already in front (i.e., active). Otherwise, a new card is created containing the requested content and the new card is brought to the front (i.e., made the active card). The new card is initially unpinned. Thus, through pinning of cards, a user can efficiently maintain useful search and browsing results.

The interface 200 also includes a story editing interface 260. The interface is a form of vertical timeline, with the start of the story at the top of the interface 260. A story includes a sequence of segments (e.g., 262, 264). Each audiovisual segment 266 includes a reference to audiovisual information for the segment, which may be represented by one or more still frames or other icons. Each text segment 268 includes related text. The duration of the audiovisual information for a segment may be displayed. The estimated duration of the related text, when read, may be displayed. The duration of the related text may be determined, for example, using the methods described in U.S. Pat. No. 5,801,685. The total duration of the story may be displayed at 278. If different, the duration of the media segments and the duration of the text may be displayed separately. Note that machine control instructions or other text that is not read (such as if the text represented a transcript of recorded audio) may be omitted from the timing computations. Pauses for the reader of the text may represented by a command (IN:, RUNS: [duration in seconds of pause], OUT: ). Information about this story from the story database may be displayed in an information bar 276. Buttons for text editing and formatting are provided at 274. More details regarding the editing operations and the use of the user interface 200 will be described in more detail below.

The various sections of this user interface 200, namely the video viewer 202, searching and browsing interface 240, research pane 244 and story editing interface 260, may be arranged and sized relative to each other in any manner, except that they are pinned together to avoid overlap. Such an interface can be implemented as described in U.S. Pat. No. 6,141,007. This capability permits the user to size the interface for different types of computer displays, including workstation monitors that are used in a portrait, or vertical, mode (in which the height of the display is longer than its width) instead of a landscape, or horizontal mode.

Figure 3:
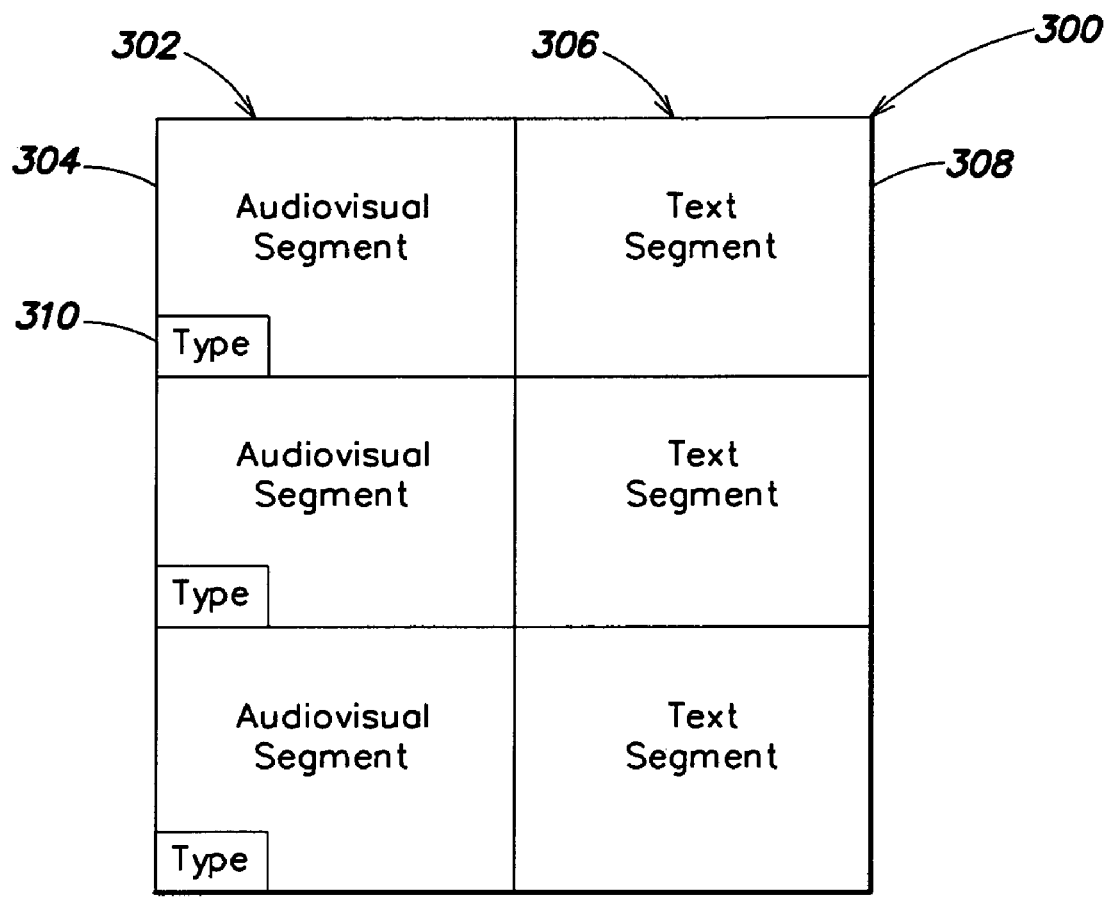
FIG. 3 is a diagram of an example data structure for representing a story in the editing system.

FIG. 3 is a diagram of an example data structure for representing a story in the editing system. Other data structures may be used. In this data structure 300, a story is defined as a list 302 of audiovisual segments 304 (also called "media segments") and a related list 306 of text segments 308. A correspondence mapping between audiovisual segments 304 and text segments 308 is maintained. In the examples that follow, the mapping between audiovisual segments and text segments is one-to-one. Mappings of n audiovisual segments to 1 text segment and 1 audiovisual segment to n text segments also are possible.

Each text segment stores text that an operator may enter through the user interface 260. This text may be script that is intended to be read, for example, by a newscaster. This text also may be comments about an associated audiovisual segment or may be a transcript of the audio track from an associated audiovisual segment.

Each audiovisual segment has a type 310. There are three primary types: voice, SOT and script.

A script segment includes a list of video clips and an optional transition effect that is applied to the transition between this segment and the next segment, such as a dissolve or a wipe. The type of the effect and control parameters (such as duration) for the effect are specified.

Similarly, voice and SOT segments include a list of video clips and an optional transition effect. In addition, these segments include a list of timing control elements. A timing control element is one of a voice clip (voice segments only), a SOT clip (SOT segments only), and a pause element, which specifies a duration of silence.

As noted above, script segments, voice segments and SOT segments each include a list of video clips. A video clip, found in the list of video clips of these various types of segments, is represented by a set of data. These data include a reference to a master clip, which may include audio, video or both, or to a still photo in an image file. The portion of the master clip that is used is specified by a start location in the master clip (mark-in) and an end location in the master clip (mark-out). A start location and duration also could be used. A Boolean flag indicates whether the clip is an "automatic trim to fit" clip, which is described in more detail below. Optionally, operation can be restricted so that there is a maximum of one automatic trim to fit video clip within each media segment. For automatic trim to fit clips, a trim to fit mode also may be specified, indicating whether to lock the in point, the out point or some other specified flame. When a particular flame is specified, a percentage also is specified.

For the first video clip in a media segment, a Boolean flag indicates whether the clip is an extension of the last video clip of the previous media segment. Similarly, for the last video clip in a media segment, a Boolean flag indicates whether the clip is extended into the following media segment. Extended clips also are described in more detail below.

Audio settings for a video clip also may be set by properties of the video clip. Examples of such settings include the following. A Boolean flag may indicate whether the associated NAT audio from the master clip is used. Another Boolean flag may indicate whether a NAT audio replacement clip, described below, is used. Another Boolean flag may indicate whether the associated SOT audio from the master clip is used. This flag is false for a video clip in a SOT segment. Yet another Boolean flag may indicate whether the NAT and SOT source audio tracks should be flipped, i.e., to treat the default NAT source track as the SOT track and vice versa. Another field may set a NAT audio level in decibels, or may specify that the NAT audio level should be automatically ducked, as described below. Yet another field may set a SOT audio level in decibels, or may specify that the SOT audio level should be automatically ducked.

A variety of other parameters may be stored in a video clip representation, such as settings and specifications for a variety of effects on a clip. For example, a title can be represented by a title start location (relative to the master clip), title duration, title text, and a title graphic template specification. Clip effects and parameters, such as motion stabilization, pan and zoom, and color correction can be specified.

An automatic trim to fit video clip, mentioned above, is a video clip which automatically adjusts its length to do the best possible job of matching the timing of the list of video clips to the sum of the durations of the timing control elements for the segment containing that list of video clips or to the length of a corresponding text segment. This duration is the duration of the audio for a SOT segment or voice segment, or the duration of associated text for a script segment. The mark in, mark out, or both, may be adjusted based on trim to fit mode parameters. Exact matches may be limited by media duration or the impossibility of trimming to less than zero length. The editing system may set a minimum duration for any automatic trim to fit clip.

A NAT audio replacement clip, mentioned above, includes a reference to a master clip. The portion of the master clip that is used is specified by a start location in the master clip (mark-in). The duration (which determines the mark-out) is taken from the duration of the associated video clip. Such a clip would be used to reference audio, other than the NAT sound recorded with a video clip, to be played instead of the NAT sound from the video clip.

As noted above, for voice segments, a list of timing control elements is provided in addition to the list of video clips. In voice segments, these timing control elements are voice clips and pause elements. A voice clip is specified by the following data. Similar to a video clip, it includes a reference to a master clip. The portion of the master clip that is used is specified by a start location in the master clip (mark-in) and an end location in the master clip (mark-out). A start location and duration also could be used. The source audio track from the master clip to be used also is specified.

As noted above, for SOT segments, a list of timing control elements is provided in addition to the list of video clips. In SOT segments, these timing control elements are SOT clips and pause elements. A SOT clip is specified by the following data. Similar to a video clip and voice clip, it includes a reference to a master clip. The portion of the master clip that is used is specified by a start location in the master clip (mark-in) and an end location in the master clip (mark-out). A start location and duration also could be used.

A variety of audio settings may be represented by properties of the SOT clip. For example, a Boolean flag may indicate whether the associated NAT audio from the master clip is used. Another Boolean flag may indicate whether a NAT audio replacement clip, described below, is used. Another Boolean flag may indicate whether the NAT and SOT source audio tracks should be flipped, i.e., to treat the default NAT source track as the SOT track and vice versa. Another field may set a NAT audio level in decibels, or may specify that the NAT audio level should be automatically ducked. Another field may set a SOT audio level in decibels, or may specify that the SOT audio level should be automatically ducked.

Similarly to video clips, a variety of other parameters may be stored in a SOT clip representation, such as settings and specifications for a variety of effects on a clip. For example, a title can be represented by a title start location (relative to the master clip), title duration, title text, and a title graphic template specification. Clip effects and parameters, such as motion stabilization, pan and zoom, and color correction can be specified.

As will be noted below, it is assumed that the tracks in master clips of video and audio have a known correspondence to their status as SOT or NAT sound. Typically, there are default settings, such as a site setting, that define an input audio track mapping. This is a mapping from master clip audio tracks (for example A1, A2) to meaningful source audio track designations such as SOT and NAT. An example input track mapping is A1=SOT, A2=NAT, and A1=VOICE. A site setting or other default setting also may define an output audio track mapping. This is a mapping from output audio track designations such as (for example VOICE, SOT, NAT) to sequence tracks (for example A1, A2, A3). An example output track mapping is A1=SOT, A2=NAT, A3=VOICE, and A4=EXTRA. The sequence generation process (described below in connection with FIGS. 10-12) uses the input audio track mapping to determine which track of the source master clip contains the desired source audio track. The destination track in the generated sequence is determined by using the output audio track mapping. For example, VOICE material may come from track A1 in the source, and may be mapped to track A3 in the generated sequence. This automated track patching based on designations of the function of the input and output tracks relieves the editor of the need to manually define input to output track patching as in current video editing applications. The flip NAT and SOT audio tracks option on a clip is used to override the default patching for a source that has the tracks reversed.

These track mappings are particularly useful in combination with how the user inserts media into a story. In particular, the user selects media and a segment type (B-roll, SOT or Voice) and places the media at the desired location in the story. The editing system automatically defines parameters, such as designating the correct audio tracks, which minimize the chance for errors and speeds the workflow.

Optionally, in addition to the script, SOT and voice types of segments, two special types of segments, start pad and end pad segments, also can be provided. A start pad, if present, is the first segment in a story. An end pad, if present, is the last segment in a story. Pad segments may be created automatically based on site settings, and might be mandated by the settings, in which case they cannot be deleted. The start pad segment includes parameters that are use d to create material based on the mark in of the first video clip of the following segment. For example, the parameters may effectively extend the in point of the first video clip backwards by the duration or to provide a freeze frame of the first frame o f that first video clip for a time equal to the pad duration. The start pad is used to provide time for playback to commence prior to the actual start of the story. In other words, the goal is to produce a smooth pre-roll into the actual story, giving time for the playback device to attain stable playback and the technical director to switch/wipe to the story, prior to the story audio beginning. The end pad is nearly identical to a script segment, except there is no associated text segment. The control duration for an end pad is the end pad duration that may be specified by default, for example by a site setting. The end pad is a list of video clips. The end pad is provided so that a broadcast does not go black, for example if the newscaster runs long or if some technical difficulty prevents switching to the next story. The start and end pad durations are not considered part of the official story duration, for purposes of meeting the time assigned by the producer.

In general, using these data structures, the timing of a story is defined by the list of video clips and the list of timing control elements in the audiovisual segments. The script may have an impact on the timing if it sets the length of an automatic trim to fit video clip in a script segment. In particular, for a script segment, the estimated duration of the script from the corresponding text segment is used to provide an estimated duration of the audiovisual segment. Otherwise, the length of each segment is set by the longer of the list of timing control elements or the list of video clips. As described in more detail below, the timing information from the script, video clips, SOT clips and voice clips can be used to indicate in the user interface, during editing, where video information is required so as to provide enough video to match.

Given these primary data structures for representing a story, a variety of editing operations can be provided that manipulate and modify these data structures. To facilitate editing, a visual representation of a story can be generated for the user interface. Also, a story may be transformed to provide a more conventional sequence-like representation, as will be described in more detail below. A representation of this structure also may be embedded in a story, which also will be described in more detail below.

The variety of editing operations and how they modify the underlying story data structure will now be described.

An insert operation inserts an empty segment at any point in the list of media segments, except not prior to any start pad segment and not after any end pad segment. The command may be invoked to insert a segment either before or after a selected segment. An empty text segment may be created and associated with the new media segment. The user interface could be provided with a context menu associated with a selected segment. Such context menus for an object are typically activated by clicking on a right button of a standard mouse while a cursor appears over the object. The context menu may provide the option for inserting a segment before or after the selected segment.

A delete operation deletes a set of media segments and their associated text segments from the list of media segments. After selecting one or more segments, the user may simply press the delete key.

A copy operation uses a set of media segments as input, typically selected by the user through the graphical user interface. The operation stores the information for a set of media segments and their associated text segments on the clipboard. Similarly, a cut operation also uses a set of media segments as input. The operation performs a copy operation first, and then deletes the set of media segments and their associated text segments.

The paste operation uses an insertion location as input, typically selected by the user through the graphical user interface. The operation creates a set of segments and associated text segments from the clipboard and inserts those segments and text segments into the story data model at the insertion location.

Drag and drop editing operations also may be performed on a set of selected media segments. After one or more segments are selected, the user may drag the segments to a desired insertion location using the graphical user interface and associated pointing device, such as the mouse. This operation effectively cuts the selected segments from their original location and pastes them at the insertion location.

A text split down operation uses a text cursor location in a text segment as input. For example, the user may place the text insertion cursor in the text segment at the desired location and then select this operation. This operation creates a new text segment following the media segment associated with this text segment. A corresponding media segment also may be created. The text in the text segment following the cursor location is removed from the original text segment and placed as text in the new text segment.

Similarly, a text split up operation uses a text cursor location in a text segment as input. For example, the user may place the text insertion cursor in the text segment at the desired location and then select this operation. This operation creates a new segment before the media segment associated with this text segment. The text in the text segment preceding the cursor location is removed from the original text segment and placed as text in the new text segment.

A text push down operation uses a text cursor location in a text segment as input. For example, the user may place the text insertion cursor in the text segment at the desired location and then select this operation. The text in the text segment following the cursor location is removed from the original text segment and prepended to the beginning of the next text segment in the story.

Similarly, a text push up operation uses a text cursor location in a text segment as input. For example, the user may place the text insertion cursor in the text segment at the desired location and then select this operation. The text in the text segment preceding the cursor location is removed from the original text segment and appended to the end of the preceding text segment in the story.

An insert video clip operation uses a region of a master clip and an insertion point in a media segment video list as inputs. A new video clip is created and inserted at the specified location in the video clip list. As shown in connection with FIG. 2, a user may mark a region of a master clip in the video monitor 202 in source mode. The user then invokes this operation by selecting the video monitor source type overlay "B-roll" entry with the mouse cursor, and then dragging the mouse cursor to an insertion point in the storyline. The user also can invoke this operation by selecting an insertion point in the storyline while the portion of the master clip is selected, and then selecting the "Insert B-roll" operation. This operation could be selected using a keyboard shortcut, or buttons similar to the overlay menu 270.

An insert voice clip operation can be performed in two ways. First, the inputs may be a region of a master clip and an insertion point in the list of timing control elements of a voice segment. In this case, a new voice clip is created and inserted into the list of timing control elements for the voice segment. Second, the inputs may be a region of a master clip and a script segment. In this case, the script segment is converted to a voice segment and the list of timing control elements is initialized to contain a new voice clip. Voice clips are shown in the user interface in connection with FIG. 8. The user interface may permit a user to invoke the insert voice clip operation by, for example, marking a region of a master clip in the video monitor in source mode. The user then may select the "Voice" option in the overlay menu, for example with the mouse cursor, and then drag the mouse cursor to an insertion point in the storyline. As another example, the user may mark a region of a master clip in the video monitor in source mode. The user then may select an insertion point in the storyline, and then select the "Voice" operation. This operation could be selected using a keyboard shortcut, or buttons similar to the overlay menu 270. This operation also may be invoked by recording a voiceover while a segment is selected.

An insert SOT clip operation also can be performed in two ways. First, the inputs may be a region of a master clip and an insertion point in the list of timing control elements of a SOT segment. In this case, a new SOT clip is created and inserted into the list of timing control elements for the SOT segment. Second, the inputs may be a region of a master clip and a script segment. In this case, the script segment is converted to a SOT segment and the list of timing control elements is initialized to contain a new SOT clip. SOT clips are shown in the user interface in connection with FIG. 8. The user interface may permit a user to invoke the insert SOT clip operation by, for example, marking a region of a master clip in the video monitor in source mode. The user then may select the "SOT" option in the overlay menu, for example with a mouse cursor, and then drag the mouse cursor to an insertion point in the storyline. As another example, the user may mark a region of a master clip in the video monitor in source mode. The user then may select an insertion point in the storyline, and then select the "SOT" operation. This operation could be selected using a keyboard shortcut, or buttons similar to the overlay menu 270.

Operations to delete, cut, copy and paste clips are similar to the same operations on segments. For example, a delete clip operation deletes a set of clips from the list of video clips or the list of timing control elements. A user may simply s elect one or more clips through the user interface, then press the delete key.

The copy operation uses a set of clips as input. The operation stores the information for a set of clips clipboard along with the original order of the clips. Similarly, the cut operation also uses a set of clips as input. The operation performs a copy operation first, and then deletes the set of clips and their associated text segments.

The paste operation uses an insertion location in the video clip list or the timing control element list as input. The operation constructs a set of new clips from the information on the clipboard and inserts them into the list at the specified location.

A trim operation changes the mark-in or mark-out property of a clip. In the user interface, a user selects a clip. This selection causes the editing system to enter a trim mode. The monitor controls 224 and 226, or trim handles associated with the still frame shown in the display, then may be used to adjust the mark in or mark out point of the selected clip.

Figure 9:
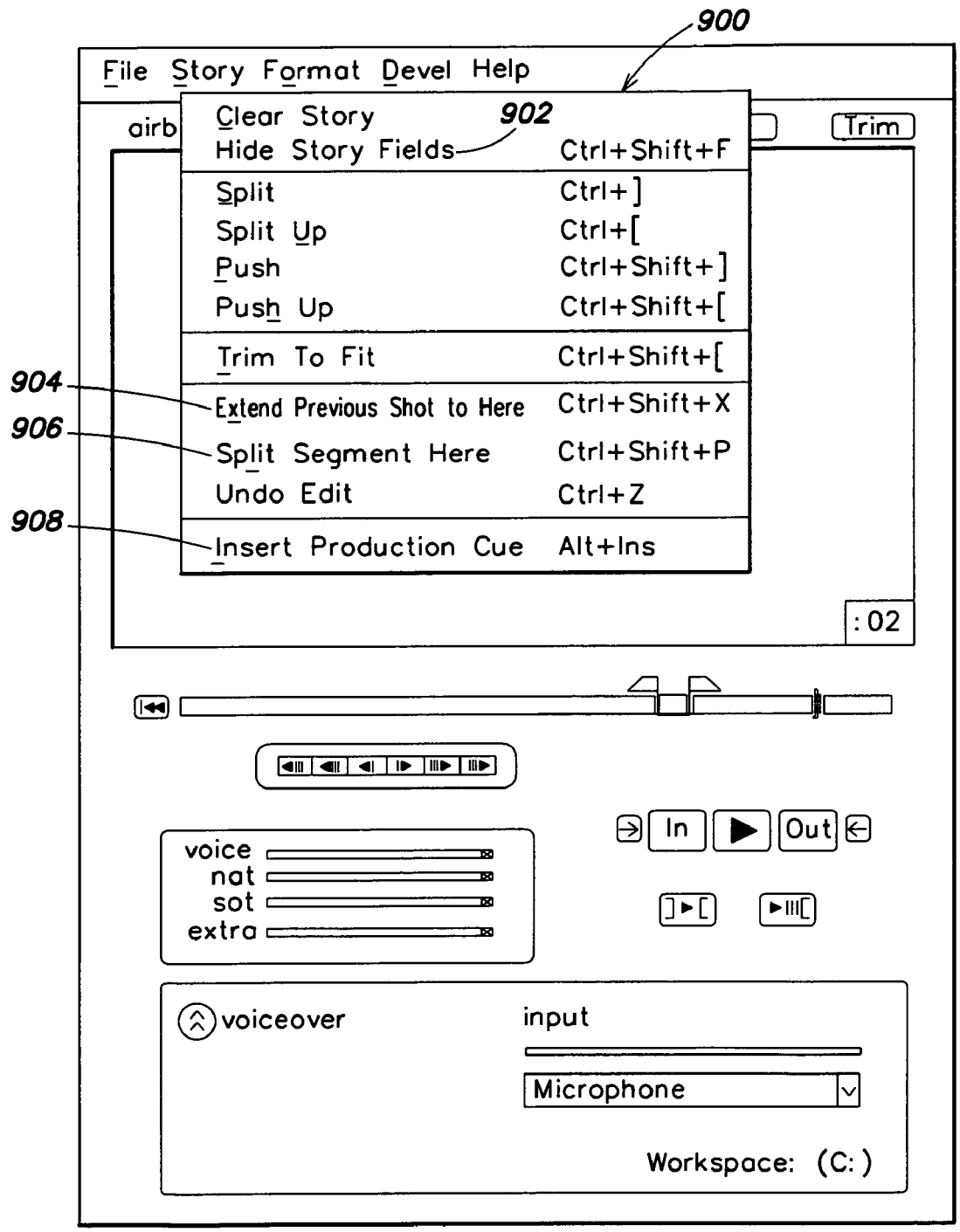
FIG. 9 is a diagram of part of an example user interface for the editing system illustrating the story menu.

An operation that extends a clip to a location, commonly called an "L-cut," uses a position in the sequence as an input. The segment whose sub-sequence includes this input position is identified. The distance, called the extension duration, from the beginning of the identified sub-sequence to the input position is determined. The last video clip in the list of video clips in the preceding segment is then identified. If the duration of the timing control elements of the preceding segment (its control duration) is greater than the duration of its list of video clips (its video duration), the difference between the control duration and the video duration is added to the mark-out of the last video clip in that segment. This trimming out of the last clip extends the last clip to the end of that segment's sub-sequence. Next, a new video clip is added to the segment containing the input position, based on the last video clip of the preceding segment. The mark-in of the new clip is set to the mark-out of the last video clip of the preceding segment. The duration of the new clip is then set to the extension duration. The new clip is also flagged as an extension from the previous segment, and the original clip is flagged as being extended into the following segment. The new video clip is inserted into the beginning of the list of video clips of the segment containing the input position. The system performs these steps in response to a user invoking a "Extend and create L-cut" operation given a selected position in the story sequence (FIG. 9).

A split segment operation uses a position in the sequence as input. The input position is mapped back to a location in a video clip in the list of video clips, and a location in an element in the list of timing control elements. The lists are then split into two lists at that position. If the position falls within a clip, the clip is split into two pieces, which each piece being added to the respective new lists. The split lists are then used to create two segments that replace the original segment in the story. The system performs these steps in response to a user invoking a "split" operation given a selected position in the story sequence.

A default L-cut operation uses a video clip in the sequence as an input. This operation is similar to an extension of a clip, but extends a default duration into the next segment. This operation can be applied to video clips that are the last clip in the list of video clip for a segment, and that are not extended to the next segment. When such an operation is invoked, the selected video clip is marked as extending into the next segment. A new video clip is inserted into the beginning of the list of video clips of the segment following the segment containing the input selected video clip. The new video clip references the same master clip as the input video clip, and the new clip's mark in is set to the the input clip's mark out. The new clip's duration is set to be a default L-cut duration which may be set as a site setting. Other properties of the new clip are taken from the input clip.

A voiceover recording operation is used to create a voice clip. An example user interface for such an operation is described in more detail below in connection with FIG. 8. Given a selected segment, and an input invoking the voiceover recording operation, audio is recorded. During recording a special voiceover sequence is created from the story. This voiceover sequence is the same as the sequence generated from a story, described in more detail below in connection with FIGS. 10-12, but with the following changes. First, any voice clips in the timing control element list for the selected segment are ignored and not placed in the sequence. NAT and SOT ducking, also described below, are performed as if there were a non-empty span on the VOICE track for the entire sub-sequence corresponding to the selected segment. The voiceover sequence is played from a time, designated by a pre-roll duration, prior to the sub-sequence corresponding to the selected segment, up to an end time, designated by a post-roll duration, after the sub-sequence corresponding to the selected segment. Audio is recorded for the entire duration of the playback of the voiceover sequence. After playback/recording, the timing control element list for the selected segment is cleared and a single new voice clip is placed in the list. The new voice clip references the just-recorded audio master clip, for the region corresponding to the sub-sequence corresponding to the selected segment, excluding the pre-roll duration and the post-roll duration.

Several properties of clips can be edited as well. For example, the automatic trim-to-fit property, the property indicating whether to use the natural soundtrack (NAT sound) for a video clip, and the property indicating that the NAT and SOT tracks of a video clip are flipped, all are properties that can be edited by the user. A context menu may be activated for a selected clip to permit the properties for that clip to be edited. Such a menu could have operations designated for toggling the state of properties such as automatic trim-to-fit, the "Use NAT" property, and the "Flip NAT and SOT Tracks" property. Other properties of a selected clip could be modified in a similar manner.

A script also can be imported to create an initial story of script segments with no corresponding video. This operation can be invoked given a script as an input. At each break in the script, as may be designated by any of a number of delimiters, a new text segment is created. The text from the script is extracted and added to the text segment.

Addressing now the visual representation of a story resulting from such operations, the user interface of FIG. 2 permits a user to invoke the editing operations that cause the computer to modify the data structure that represents the story, and in turn to update the display to reflect the changes made to the data structure.

The visual aspects of some of the available editing operations will now be described in more detail in connection with FIGS. 2 and 4-9.

Referring to FIG. 2, when a user is reviewing source material in the viewer window 202, the user may select in and out points through buttons 208 and 210 or using trim handles 224 and 226. Given a selected clip, an overlay menu 270 is displayed, which permit a user to select whether the video clip will be added to the segment as a b-roll clip, SOT clip or voice clip. Optionally, keyboard shortcuts or graphical buttons also may be used to invoke these functions. A graphical representation of the clip is generated and displayed in the segment. The different kinds of clips may be color coded in the user interface; in particular, a visual distinction among b-roll clips, SOT clips and voice clips can be provided by using different colors for these clips. The video clip is added to a segment, e.g., segment 266, as the selected type of clip. The user also may begin editing by simply typing text in a segment, e.g., segment 268.

Figure 4:
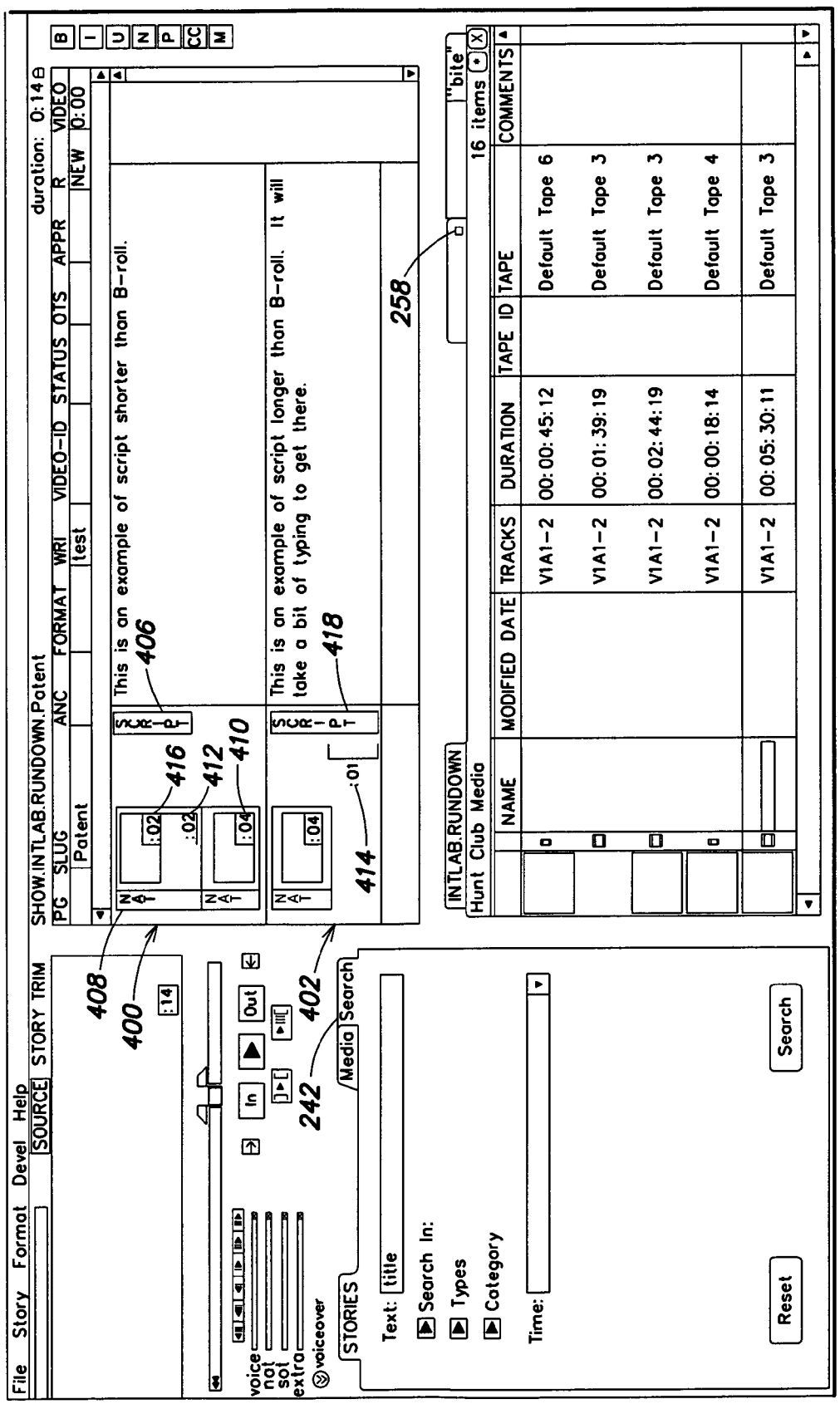
FIG. 4 is a diagram of an example user interface for the editing system illustrating editing of script segments and text segments.

Referring now to FIG. 4, an example of a story is shown. The story has two script segments resulting from adding selected video clips as "B-roll" and some script text. In the top segment 400, the associated script is shorter than the duration of the video clips in the audiovisual segment. In the bottom segment 402, the associated script is longer than the duration of the video clips in the audio visual segment. Each video clip in a segment is represented by a still frame 404 from that clip. Another icon 408 represents the usage of the natural soundtrack (NAT sound) from the master clip from which the video clip was selected. The duration 410 of a clip may be displayed. Other timing information about the story could be generated and displayed, for example, the relative time at which each segment will start in a sequence generated from the story. The estimated duration of the related text also may be displayed. A script icon 406 may be used to represent this duration. The duration of the related text may be determined, for example, using the methods described in U.S. Pat. No. 5,801,685.

If the related text of a segment is too long, the reader, e.g., a newscaster, will not finish reading the text before playback of the subsequent segment of audiovisual information begins. If the text is too short, there may be silence or a lack of flow to the subsequent clip after the reader finishes reading the text. Accordingly, the estimated time for reading the text of the script may be compared to the actual duration of the audiovisual material of the segment. An indication of the difference between the duration of the audiovisual information and the duration of the related text may be displayed to the editor. For example, if the duration of the script is shorter, the duration of the clip that extends beyond the script can be illustrated on the graphical representation of the clip, as shown at 412. Thus, the duration of the clip that matches the script is shown at 416, and the graphical representation of the clip is extended to shown the duration of the additional video material. If the duration of the script is longer, the script icon 418 is illustrated as longer than the video clip. A symbol 414 illustrates the difference in the durations of the video and the script. This difference may be displayed as a number of frames of the video information, for example. Different colors may be used to display this difference according to whether the text is too long or too short. Also, the text may be shaded to indicate the extent of the text covered by the audiovisual information.

Because the duration of the audiovisual information for each segment is known and the duration of the related text can be estimated, this information can be used to provide a number of useful editing capabilities. For example, a user may use these displays to trim the video or edit the text to make the durations match. In response to editing of the script for a segment, the duration of the script, the size of its corresponding icon, and the corresponding displayed durations of the video at 412, 416 and 414 can be updated. Other operations and user interface features are described in more detail below.

Figure 5:
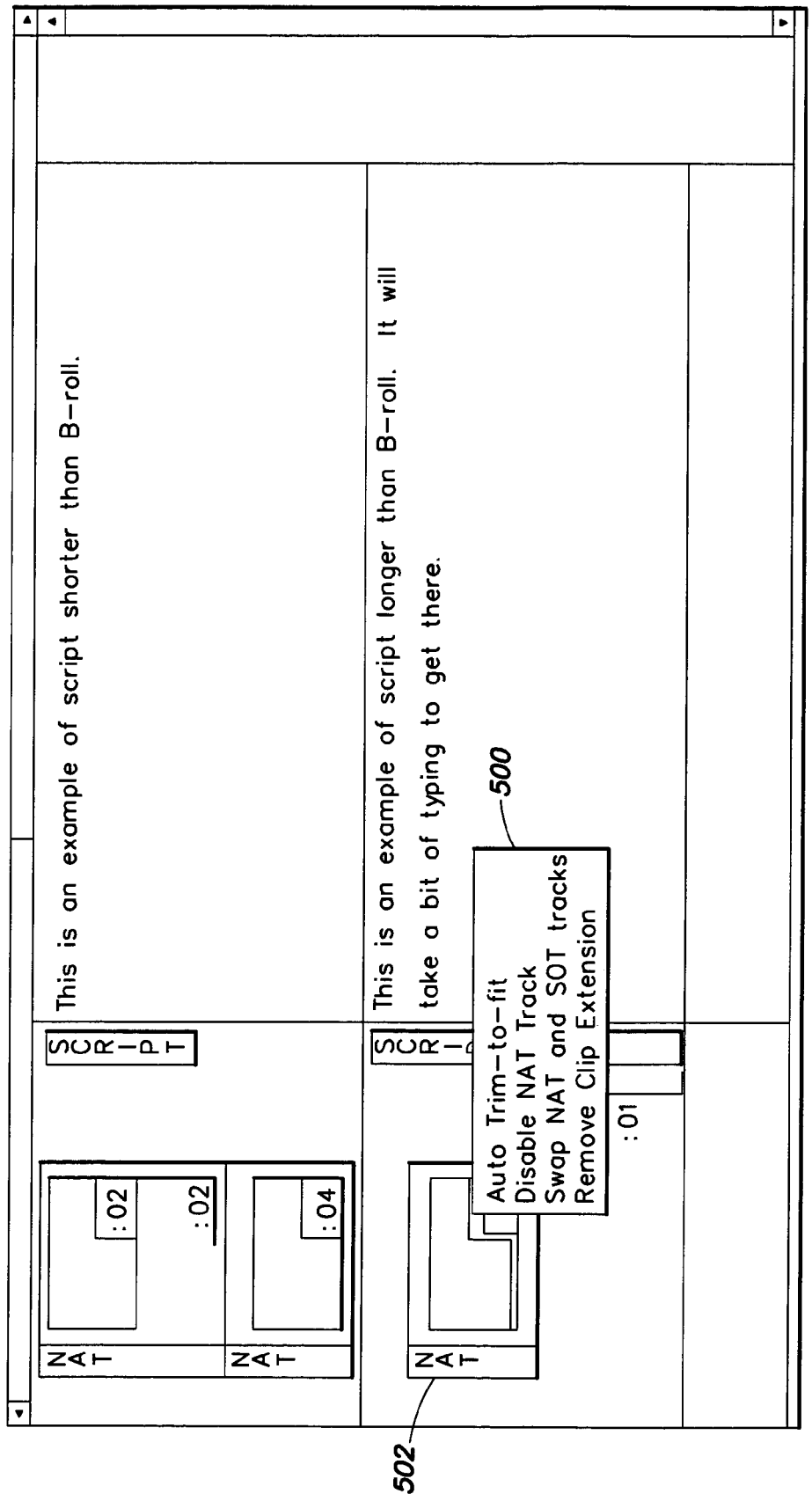
FIG. 5 is a diagram of part of an example user interface for the editing system illustrating a clip menu.

As shown in FIG. 5, several menu options are available for each video clip. A context menu 500 can be displayed after a user selects a clip (for example by clicking the right button on a standard mouse). One of the options is to disable the NAT track. When disabled, the NAT track icon 502 is removed from the display and the appropriate Boolean value in the video clip data structure is set. Another option is to swap the NAT and SOT tracks. Site settings typically dictate which audio track should be a NAT track and which audio track should be a SOT track. However, the video clip might not have the audio recorded on the appropriate track. This menu option permits the user to correct the video clip by swapping the track designations. When selected, the appropriate Boolean value in the video clip data structure is set.

Another operation that can be selected for a clip is called "automatic trim to fit". When selected, the Boolean value for this clip which indicates whether it is to be automatically trimmed to fit is set. Optionally, the same Boolean value for any other clips in the same segment is cleared so that only one clip in any segment can be automatically trimmed to fit.

Figure 6:
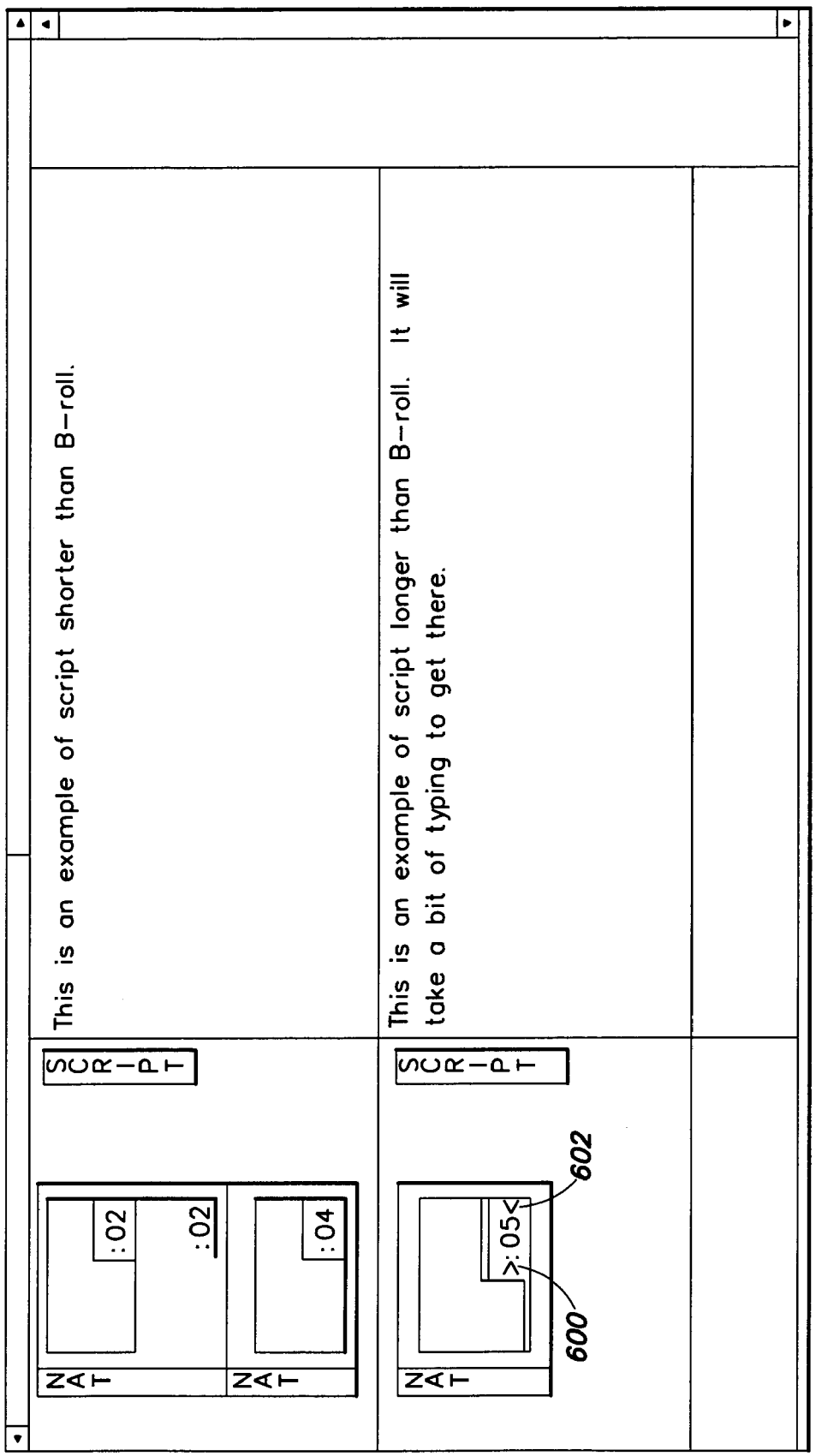
FIG. 6 is a diagram of part of an example user interface for the editing system illustrating trim to fit behavior.

This operation automatically makes the durations of the script and video match by invoking a trim operation at the beginning or the end, or both, of the audiovisual material. When initially invoked, the trim operation is applied to the video clip. A setting can define whether the in point of a clip remains fixed and the out point is adjusted, or whether the in point is adjusted and the out point is fixed, or whether both the in points and out points are proportionally adjusted with respect to a fixed center point. The result of applying this operation to the clip shown in FIG. 5 is shown in FIG. 6. Note that the out point has been trimmed, and the display has been updated, to make the video clip and the script the same length, i.e., five seconds long. Symbols ">" 600 and "<" 602 surrounding the duration of the video clip are used to indicate that the clip is automatically trimmed to fit.

Figure 7:
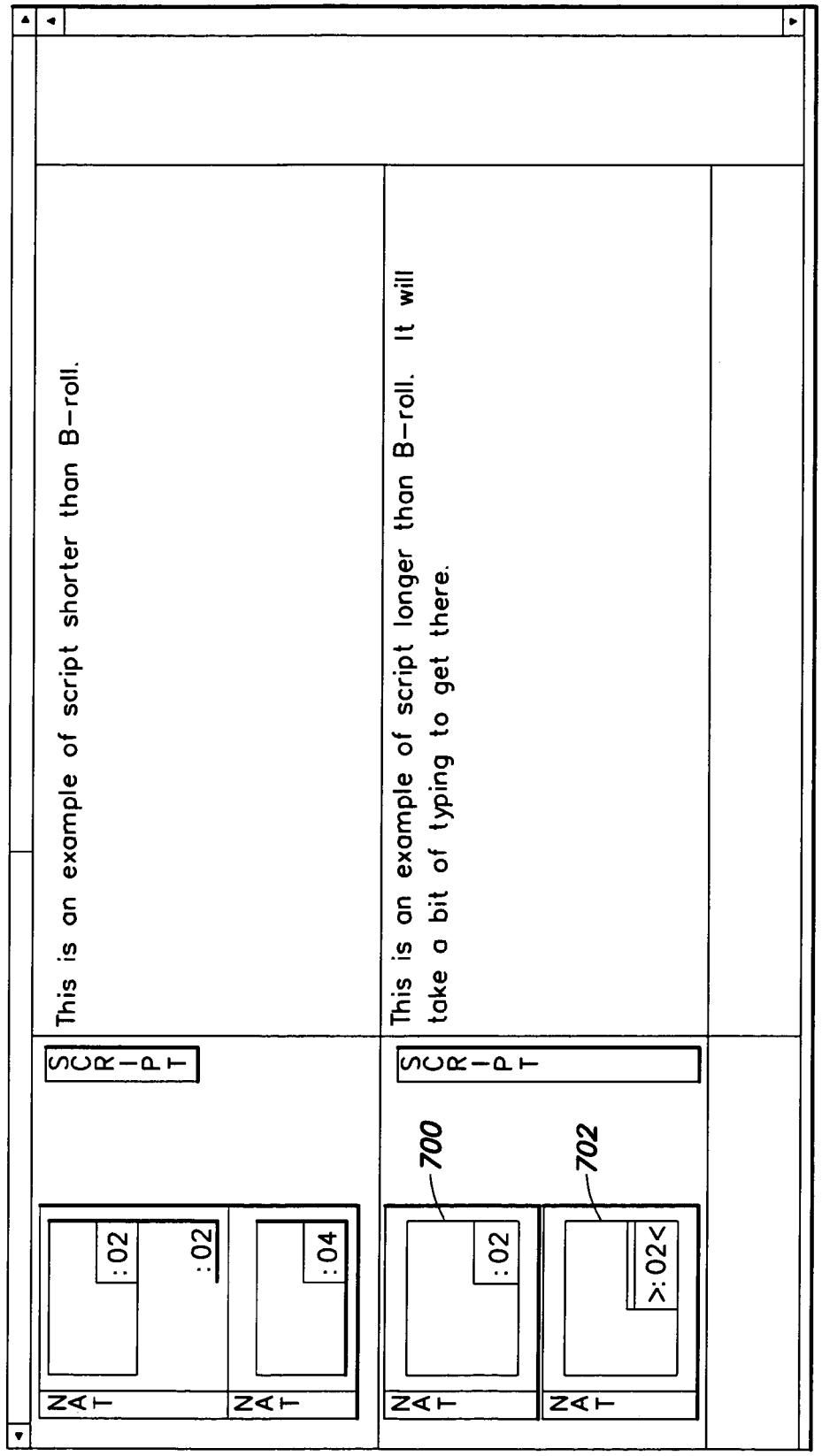
FIG. 7 is a diagram of part of an example user interface for the editing system further illustrating automatic trim to fit behavior.

The video clip also can be continually and automatically trimmed to match the duration of the associated text as the text of a text segment is edited or changed. For example, as text is added at the end of a text segment that causes the duration of the text to be longer than its corresponding audiovisual segment, the video clip can be automatically trimmed to be longer. Similarly, as text is removed, the video clip can be automatically trimmed to be shorter. The user interface could also display whether there is sufficient video information to permit such trimming to be performed. If another video clip is added before or after the automatically trimmed video clip, appropriate adjustments also are made to the clip. For example, as shown in FIG. 7, the addition of a video clip 700 of two seconds before the automatically trimmed clip results in the other clip 702 being trimmed so that the total duration of the audiovisual segment matches the length of its corresponding text segment.

Figure 8:
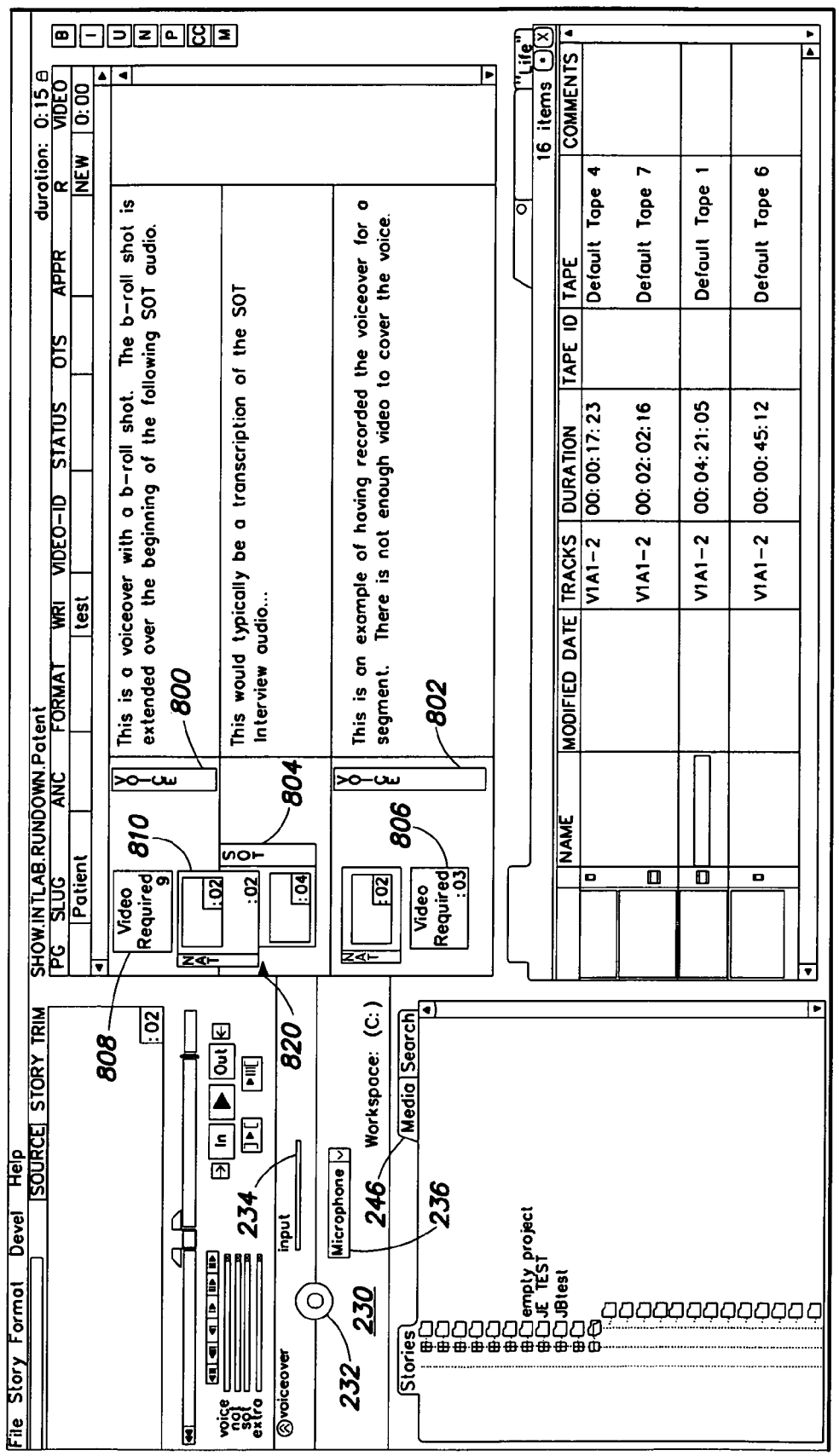
FIG. 8 is a diagram of part of an example user interface for the editing system illustrating voice and SOT clips.

Other editing operations relating to SOT clips, voice clips and extended edits will now be described in connection with FIGS. 8 and 9. A voice clip may be created, for example, by recording a voice over, which is initiated by a user through the voiceover control interface 230. Alternatively, a voice clip may be retrieved through searching or browsing the available media. When a voice clip is added to an audiovisual segment, it appears in the list of timing control elements. When displayed, it appears as an icon such as shown at 800 or 802.

Similarly, when a selected video clip is added as a SOT clip, the SOT clip appears in the list of timing control elements. However, when displayed, as shown at 804, it is displayed with a still frame selected from its corresponding video clip, with an icon indicating that it is a SOT clip. When a SOT clip or voice clip is used in an audiovisual segment, the duration of the audiovisual segment is defined by the longer of the list of video clips and the list of SOT clips or voice clips. The script in the corresponding text segment has no effect on the timing. Typically the script is a transcription of the SOT clip.

As in the case of script segments, it is possible for a voice segment to have a voice clip that is longer than the video clips in the segment. In this case, a large "video required" icon 806 is displayed, indicating the difference in duration between the video clip and the voice clip. This icon is more prominent than the icon that shows the difference between estimated script times and the video clip. In the absence of the required video, a sequence that is generated from the story shown in FIG. 8 would result in several frames of black where there is no video information that corresponds to the voice clip.

A similar "video required" icon 808 also is shown at the beginning of a segment. This icon is shown in this position because the last video clip of the segment extends into the next segment. As noted above, the last video clip in any segment can be extended into the next segment. Similarly, the first video clip in any segment can be extended into the previous segment. A user positions a position marker 820 at the desired point in the next or previous segment and indicates that the prior or subsequent segment should be extend to that point.

Referring now to FIG. 9, the Story menu items are displayed at 900. One of these items is the "extend previous shot to here" command 904. Using the position marker 820, the user also can indicate that a segment should be split at that point with the "split segment here" command 906.

When the story fields are shown, a command 902 is provided to hide them, called "hide story fields." When a user is typing in a story field or has selected a story field, the "insert production cue" command 908 can be used to insert, for example, machine control commands used during playback. The other menu commands correspond to other editing operations described above.

A variety of other commands also could be provided. For example, any position in the text for a segment may be mapped to a corresponding position in time in the audiovisual material for the segment, and this position may be indicated to the editor. In particular, a cursor commonly represents a current editing position in text. The text between the cursor and the beginning of the text, or the cursor and the end of the text, may be used to determine a position in time corresponding to the cursor. The mapping of position between text and audiovisual material may be used to provide an indication of the current position in text, for example a moving highlight, during playback of the entire audiovisual sequence. The current position of playback in the video may be updated to match the cursor position. The mapping of timing between text and audiovisual material also may be used to provide a crawling caption display of the text beneath the video monitor, with a fixed current position indicator, such that the text scrolls by in synchronization with the audiovisual playback and at any point during playback the text mapped to the current audiovisual position is aligned with the current position indicator.

Other editing operations on the text can result in editing operations on the video information. For example, a text editing command to create a new paragraph or new page or page break could split a segment into two segments by creating a new segment of the story, which would include a reference to audiovisual information and the text occurring after the position in the text at which the editing command occurred.

Given an edited story, the data structures described above may be converted into a media sequence. A media sequence is defined by a set of concurrent audio and video tracks. Each track is a sequence of clips. Each clip references a portion of a master clip and occupies a span of time on the track. A span of time on a track may be empty. Audio spans have a volume property. The boundary between two adjacent spans may have a transition effect attached. Spans may have clip effects attached.

Figure 10:
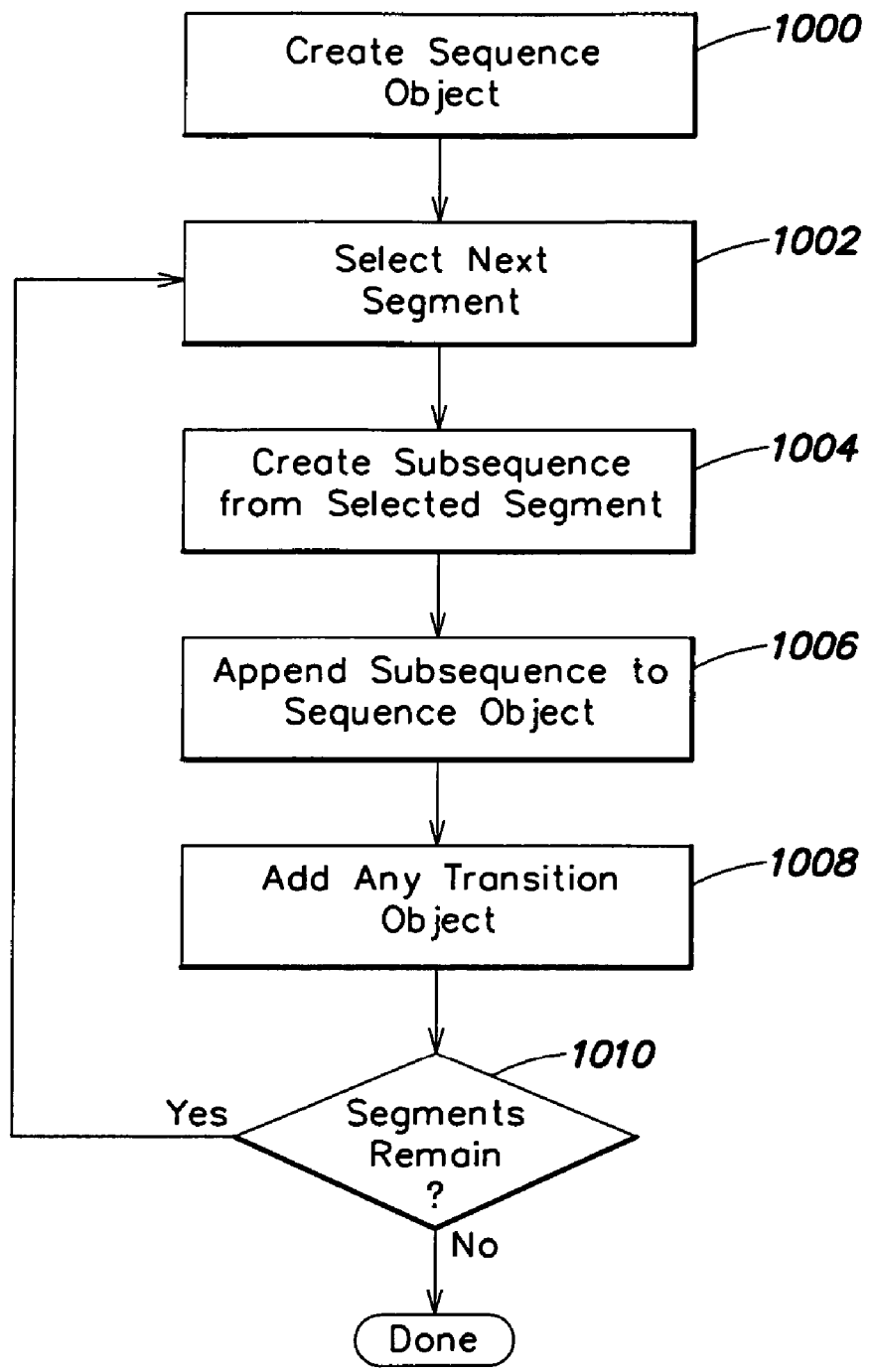
FIG. 10 is a flowchart describing how a sequence may be generated from a story.

To create a media sequence from a story, as described in FIG. 10, a sequence object is created (1000). Then, for each media segment in the story data model, a sub-sequence is generated for the media segment. In particular, the next segment in the story is selected (1002). A subsequence corresponding to the selected segment is created (1004). Each subsequence that is created is appended (1006) to the sequence object. Thus, the subsequences for the segments are concatenated in story order to create the sequence for the story. For any media segment that specified a transition effect, that transition effect is applied (1008) to the sequence boundaries between that media segment's sub-sequence and the following media segment's sub-sequence. If any segments remain, as determined at 1010, steps 1002-1008 are repeated until the entire story is processed.

Figure 11:
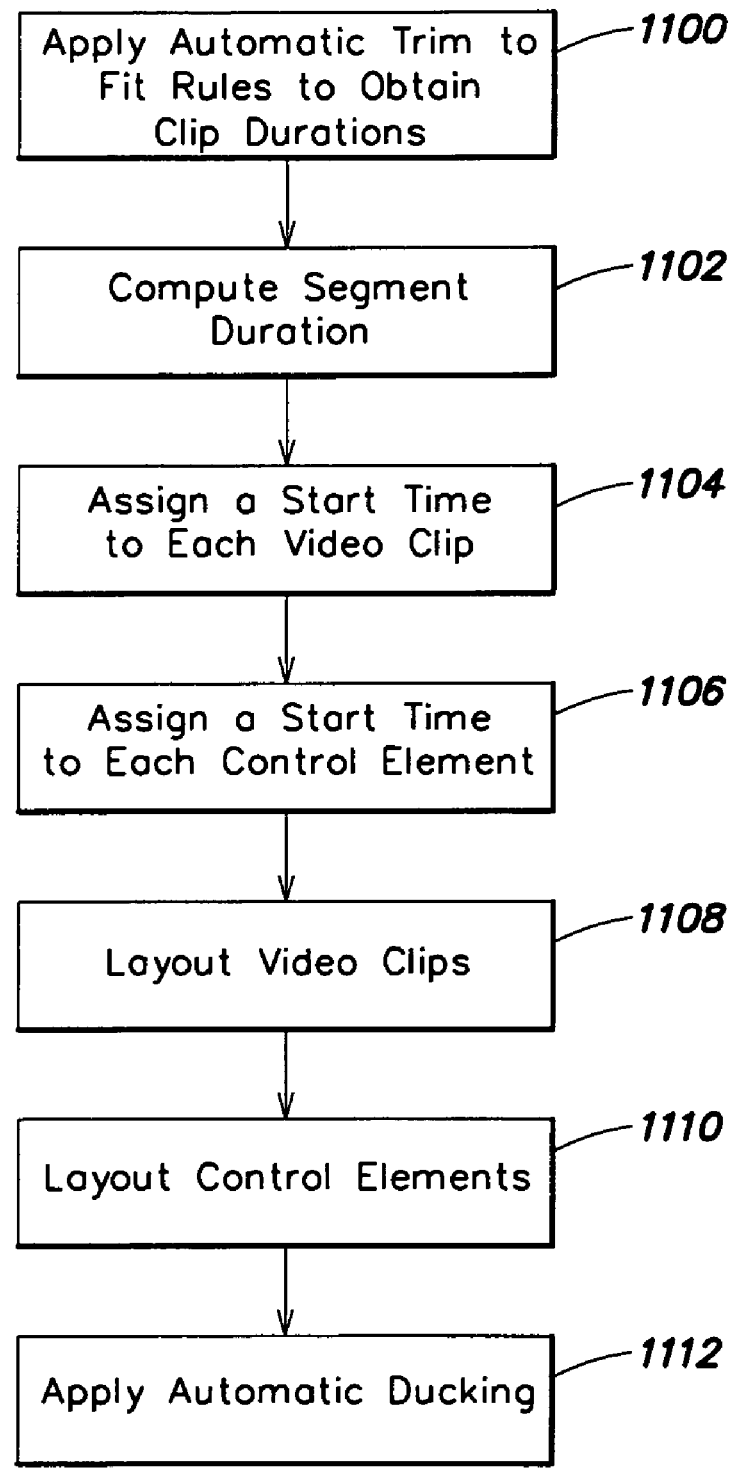
FIG. 11 is a flowchart describing how a subsequence may be generated from a segment of a story.

Generating a subsequence from a media segment (1004 in FIG. 10) will now be described in more detail in connection with FIG. 11. First, automatic trim to fit rules are applied (1100) to all clips marked as "automatic trim to fit" clips, to obtain clip durations. Other clips are static clips that have fixed durations. The duration of the segment then is computed (1102). A start time then may be assigned (1104) to each video clip for the segment. A start time also may be assigned (1106) to each control element for the segment. The video clips are laid out (1108), which can cause spans to be created on the video, NAT and SOT tracks. The control elements are laid out (1110), which can cause spans to be created on the voice, SOT, video and NAT tracks. Automatic ducking then may be applied (1112) to the audio tracks. Ducking means lowering the volume level of one audio segment in order for another simultaneous audio segment or live event to have more prominence. Ducking is used, for example, voice-over applications where, for example, level of background music or other sound is reduced, allowing an announcer to be heard clearly. Each of these operations in FIG. 11 will now described in more detail below.

To apply the automatic trim to fit rules, the video clips in the segment's list of video clips are partitioned into two sets. A first set, trim clips or trimmable clips, contains the set of all video clips that are marked as automatic trim-to-fit. A second set, static clips, contains the remaining video clips. For a script segment, a target duration is computed as the estimated timing of the text in the text segments associated with the media segment. For a voice or SOT segment, the target duration is computed as the sum of the durations of all the elements in the segment's timing control elements. A minimum edit duration also may be provided to specify the minimum length of a video edit. This value may be a site setting.

Figure 12:
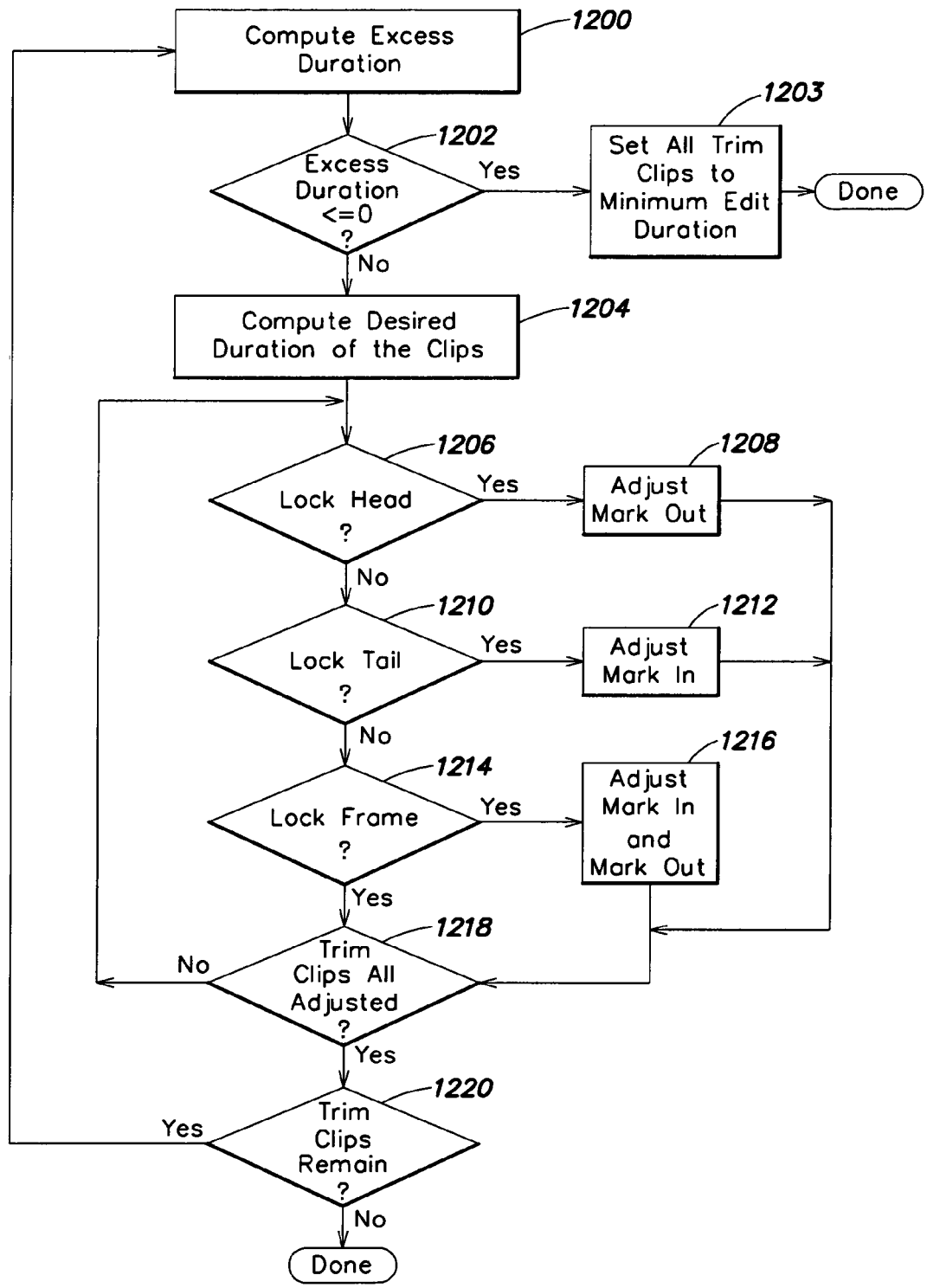
FIG. 12 is a flowchart describing how automatic trim to fit rules may be applied when generating a subsequence from a segment of a story.

Referring now to FIG. 12, the processing of the trim clip set will be described. This processing is an iterative process in which the first step (1200) is to compute a value called the excess duration. In particular, the duration of the static video clips is then computed as the sum of the durations of all video clips in the static clips set. The duration of a video clip is the mark-out minus the mark-in. A trial video duration is the status video duration plus the product of the number of clips in the set of trim clips and the minimum edit duration. The excess duration is the difference between the target duration and a trial video duration. Thus:

$$\text{trialVideoDuration} = \text{staticVideoDuration} + \text{size(TrimClips)} * \text{minimumEditDuration; and} \quad 1.$$

$$\text{excessDuration} = \text{targetDuration} - \text{trialVideoDuration}. \quad 2.$$

In general, the goal of this process is to equally apportion this excess duration among all of the trim clips. If some trim clips are not able to extend far enough, they are trimmed as far as possible and the moved to the static set of clips. When this happens, the process is performed again with the remaining trim clips to attempt to apportion any remaining excess duration among them. Eventually there are no more trim clips or all the excess duration has been apportioned.

In particular, as noted above this process begins with computing (1200). If the excess duration is less than or equal to zero, as determined at 1202, then all of the remaining trim clips are set (1203) to the minimum edit duration by setting the mark out to be the mark in plus the minimum edit duration. In this case, the processing of the automatic trim to fit rules for the segment is done.

Next, at attempt is made to adjust each trim clip to a desired duration. The desired duration of each trim clip is determined (1204) by the sum of the minimum edit duration and the quotient of the excess duration divided by the number of trim clips. Thus:

$$\text{desiredClipDuration} = \text{minimumEditDuration} + \text{excessDuration}/\text{size(TrimClips)} \quad 3.$$

Each trim clip is adjusted according to its trim to fit mode in the following way.

If the trim to fit mode for the clip is to lock the head (the mark in), as determined at 1206, then the mark out for the clip is tried and set (1208). The mark out for the clip is set to the sum of the mark in and the desired clip duration, unless the resulting mark out is beyond the end of the master clip. In that case, the mark out is set to the end of the master clip and the clip is removed from the trim clip list and added to the static clip list.

If the trim to fit mode for the clip is to lock the tail (the mark out), as determined at 1210, then the mark in for the clip is trimmed and set (1212). The mark in for the clip is set to the mark out point less the desired clip duration, unless the resulting mark in is beyond the start of the master clip. In that case, the mark in is set to the start of the master clip and the clip is removed from the trim clip list and added to the static clip list.

If the trim to fit mode for the clip is to lock a specified frame with a specified percentage, as determined at 1214, then the mark in and the mark out for the clip are trimmed and set (1216). The mark in for the clip is set to the specified frame less the desired clip duration multiplied by the specified percentage, unless the resulting mark in is beyond the start of the master clip. In that case, the mark in is set to the start of the master clip. The mark out for the clip is set to the sum of the specified flame and the desired clip duration multiplied by one less the specified percentage, unless the resulting mark out is beyond the end of the master clip. In that case, the mark out is set to the end of the master clip. If either the mark in or the mark out positions are set to the start or end, respectively, of the master clip, then th e clip is removed from the trim clip list and added to the static clip list.

Steps 1206 through 1216 are repeated for all trim clips until all trim clips are adjusted, as determined at 1218. After all trim clips are adjusted, it is then determined (1220) whether any trim clips remain. Note that a trim clip is removed from the trim clip list and placed in the static clip list if it is trimmed to the start or end of its corresponding master clip. If trim clips remain, the process of FIG. 12 is repeated with the updated static clip and trim clip lists.

If no trim clips remain (1220) or if the excess duration is less than or equal to zero (1202), then this stage of processing of the segment is completed.

Referring again to FIG. 11, the segment durations are computed (1102) in the following manner. In particular, the video duration of a segment is the sum of the durations of all video clips in the segment's video clip list. The control duration for a segment depends on the segment type. For a script segment, the control duration is the video duration. For a voice or SOT segment, the control duration is the sum of the durations of all the elements in the segment's timing control elements. The segment duration is the maximum of the video duration and the control duration of the segment. If any extra video is required for a segment, the amount of extra video required (in terms of a duration) is computed by subtracting the video duration from the segment duration.

Start times are assigned to each video clip in the list of video clips of a segment (1104 in FIG. 11) in the following manner. The times assigned to the clips are relative to the start of the sub-sequence for the segment, starting at time zero. A variable "time" is initialized to zero. Then, for each video clip in the video clip list, in the order they appear in the list, it is determined if the clip is the last clip in the list and if the clip extends into the following segment. If so, then the start time for this last clip is the segment duration minus the clip duration. Otherwise the start time for the clip is the current value of the variable "time." The variable "time" is then updated by adding that clip's duration, and the next clip is processed until the list of video clips is processed.

Start times for timing control elements of voice and SOT segments are assigned (1106 in FIG. 11) in the following manner. The times assigned to the clips are relative to the start of the sub-sequence for the segment, starting at time zero. A variable "time" is initialized to zero. Then, for each element in the list of timing control elements, in the order they appear in the list, the start time for the clip is the current value of the variable "time." The variable "time" is then updated by adding that element's duration, and the next element is processed until the list of timing control elements is processed.

The layout of the video clips (1108 in FIG. 11) builds the subsequence for a segment given the assigned start times and durations of the video clips and timing control elements of the segment. The subsequence is created with a duration equal to the computed segment duration. The subsequence has one video track, and three audio tracks called NAT, SOT, and VOICE. For video clip in the list of video clips for the segment, a span is added to the video track beginning at the clip's start time, and extending for the clip's duration. This span references the video track of the master clip referenced by the video clip, beginning at the mark in value set for the video clip. If the clip specifies a clip effect, that clip effect is applied to the span.

If the properties of the video clip indicate that the NAT audio track from this video clip should be used, then a span is added to the NAT audio track beginning at the clip's start time, and extending for the clip's duration. This span also references a master clip in the following way. If the video clip references a NAT audio replacement clip, the span added to the NAT audio track references the audio replacement clip's master clip, starting at the replacement clip's mark-in. Otherwise, if the video clip specifies that its source audio tracks should be flipped, the span added to the NAT audio track references the SOT source audio track from the master clip specified by the video clip, beginning at the mark in specified by the video clip. Otherwise, the span added to the NAT audio track references the NAT source audio track from the master clip specified by the video clip, beginning at the mark in specified by the video clip. If the clip specifies a NAT audio level, that level is applied to the span on the NAT audio track.

If the properties of the video clip indicate that the SOT audio track from the video clip should be used then a span is added to the SOT audio track beginning at the clip's start time, and extending for the clip's duration. This span also references a master clip in the following way. If the video clip specifies that its source audio tracks should be flipped, the span added to the SOT audio track references the NAT source audio track from the master clip specified by the video clip, beginning at the mark in specified by the video clip. Otherwise, the span added to the SOT audio track references the SOT source audio track from the master clip specified by the video clip, beginning at the mark in specified by the video clip. If the clip specifies a SOT audio level, that level is applied to the span on the SOT audio track.

The layout of the control elements (1110 in FIG. 11) applies to voice and SOT segments only. For each element in the list of timing control elements, the following actions are performed. If the element is a pause, it is ignored. If the element is a voice clip, then a span is added to the voice audio track beginning at the element's start time, and extending for that element's duration. This span references the audio track of the master clip specified by this element, beginning at the mark in specified by this element. If the element is a SOT clip, then a span is added to the SOT audio track beginning at the element's start time, and extending for this element's duration. This span references the master clip specified by the SOT clip, beginning at the mark in specified by this SOT clip. If the clip specifies that the source audio tracks should be flipped, the span references the NAT source audio track from the master clip specified by this SOT clip, otherwise the span references the SOT source audio track from that master clip. If a SOT audio level is specified, that level is applied to the span added to the SOT audio track.

It is possible that a portion of the video track might not be filled by a video clip where the corresponding span in the SOT track might be filled. In such a case, it may be desirable to fill the empty span with video data that corresponds to the concurrent SOT audio. Thus, if the video track in this subsequence contains an empty span in the region covered by a SOT clip element, which is defined by the element's start time and duration, this empty region is identified. The empty region is the intersection of the empty span on the video track and the region covered by the element. A span is added to the video track covering this empty region. This span references the video track of the master clip specified by the element and refers to the region that corresponds to the matching span on the SOT audio track.

When such video corresponding to a SOT track is added, it also may be desirable to also include the NAT audio that goes with that video and SOT audio. Thus, if the properties of this element indicate that the NAT track also should be used, then a span is added to the NAT audio track covering the identified empty region. If this element has a NAT audio replacement clip, the span added to the NAT track references the audio replacement clip's master clip, starting at the replacement's mark in point plus the difference between the start of the empty region and the start time of the element. Otherwise, if the element specifies that the source audio tracks should be flipped, the span added to the NAT track references the SOT source audio track from the master clip specified by the element, starting at a point so that this audio is in sync with the span on the SOT audio track of the subsequence. Otherwise, the span added to the NAT track references the NAT source audio track from the master clip specified by the element, starting at a point so that this audio is in sync with the span on the SOT audio track of the sub-sequence. If the NAT audio level is specified, that level is applied to the span added to the NAT audio track.

Automatic ducking is applied (1112 in FIG. 11) in the following manner. Automatic ducking of the NAT track involves computing, for the entire subsequence, the intersection of non-empty spans on the NAT track that do not have an audio level applied and the union of non-empty spans on the SOT track and non-empty spans on the VOICE track. The level of each contiguous region of this intersection is set to a site specified level for NAT ducking. This operation may require splitting spans where a NAT level may be specified for part of the span, but not another. Similarly, automatic ducking of the SOT track involves computing, for the entire subsequence, the intersection of non-empty spans on the SOT track that do not have an audio level applied and non-empty spans on the VOICE track. The level of each contiguous region of this intersection is set to a site specified level for SOT ducking. This operation may require splitting spans where a SOT level may be specified for part of the span, but not another.

Given an edited story, the data structures described above also may be stored in the document that stores the story. The story may be stored, for example, in a document in a markup language such as the News Story Markup Language (NSML) described in U.S. Pat. No. 6,038,573. This markup language can be extended to include hidden text within anchored elements. Anchored elements are identified by the <ae> start tag and include an identifier. Within an anchored element, hidden text may be embedded in an "ap" element identified by the <ap> start tag. After the <ap> start tag, hidden text is embedded between two delimiters. For example, the start delimiter may be "]]" and the end delimiter may be "[[". Between these two delimiters, any appropriate representation of the data structure for a media segment can be stored. For example, each master clip referred to by a clip in the media segments may be given a unique source identifier. Thereafter, a list of clips for any segment and all of the data defining each clip, can be stored. Given a document that stores the story along with the data structures representing the media segments for the story, any other system can read and process the data structures represented in the document to create a sequence. Also, in a text editor, the document may be modified, and the segments of the story can be rearranged.

The capabilities of this editing system described above help match video and audio to text and text to video and audio, which helps a journalist to edit an audiovisual story through editing operations performed primarily on the script, copy or text that is being prepared by the journalist. The editing operations described above also provide some basic video and audio editing capability that permit a story to be rapidly developed.

Although the foregoing describes a newsroom system, the combination of audiovisual information and related text may be used to develop any kind of story in which text for a script may be edited along with the audiovisual materials to which the script relates. For example, this combination may be used to prepare a documentary with a script to be read by a narrator as a voice over. Also, this editing system may be used to edit a script along with clips of video, animation, still pictures, or other media as part of a storyboarding function before and during production of additional media for the story. In this case, the clips used along with the script may be placeholders that are replaced by later produced media. The text segments also may be used for commentary instead of a script. In such a case the editing system can be used to create a rough cut, for example in post-production of a movie or television show.

A system such as described herein may be implemented in software or hardware or firmware, or a combination of the three. The various elements of the system, either individually or in combination may be implemented as one or more computer program products in which computer program instructions are stored on a computer readable medium for execution by a computer. Various steps of a process may be performed by a computer executing such computer program instructions. The computer system may be a multiprocessor computer system or may include multiple computers connected over a computer network. The components shown in FIG. 1 may be separate modules of a computer program, or may be separate computer programs, which may be operable on separate computers. The data produced by these components may be stored in a memory system or transmitted between computer systems.

The various components of the system described herein may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, a cathode ray tube display, liquid crystal displays and other video output devices, printers, communication devices such as a modem, and storage devices such as disk or tape. One or more input devices may be connected to the computer system. Example input devices include, but are not limited to, a keyboard, keypad, track ball, mouse, pen and tablet, communication device, and data input devices. The invention is not limited to the particular input or output devices used in combination with the computer system or to those described herein.

The computer system may be a general purpose computer system which is programmable using a computer programming language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. A memory system typically includes a computer readable medium. The medium may be volatile or nonvolatile, writeable or nonwriteable, and/or rewriteable or not rewriteable. A memory system stores data typically in binary form. Such data may define an application program to be executed by the microprocessor, or information stored on the disk to be processed by the application program. The invention is not limited to a particular memory system.

Having now described a few embodiments, it should be apparent to those skilled in the art that the foregoing is merely illustrative and not limiting, having been presented by way of example only. Numerous modifications and other embodiments are within the scope of the invention.

What is claimed is:

1. A news story production system, comprising:
   a database of audio and video information;
   a database of stories including text in a structured format;
   a first editing system having a user interface that permits a user to specify text for a story and associated segments including the audio and video information, and including a memory device, including a data structure stored in the memory device, wherein the data structure comprises data representing a story as a list of media segment data structures and a corresponding list of text segment data structures,
   wherein each media segment data structure represents a media segment and comprises:
      data indicative of a type of the media segment, indicating an origin of any sound for the media segment,
      data indicative of a list of video clips for the media segment, and
      wherein the types of each media segment include script, sound on tape (SOT) and voice, and wherein SOT and voice segments each include a list of timing control elements that determine the length of the media segment, and wherein video clips attached to the media segment are automatically trimmed to fit the length of the media segment; and
   wherein each text segment data structure comprises data representing text associated with the corresponding media segment, and
   the first editing system further including an output configured to store edited stories in the database of stories, and a second output configured to provide a sequence including audio and video tracks corresponding to the associated segments of the audio and video information;
   a second editing system that receives the sequence including audio and video tracks configured to permit finishing of the sequence for playback; and
   a playback system including means for processing the text for a story and means for processing the associated segments of the audio and video information.

2. The news story production system of claim 1, wherein the first editing system is configured to send a story to the playback system.

3. The news story production system of claim 1, wherein the first editing system displays a representation of the story, wherein the displayed representation of the story comprises an arrangement of nonoverlapping representations of a plurality of the segments in an order according to the sequence and, wherein the representation of each of the displayed segments comprises a portion of the audiovisual information for the segment displayed adjacent to the related text for the segment.

4. A video editing system comprising:
   a memory device, including a data structure stored in the memory device, wherein the data structure represents a story as a list of media segment data structures and a corresponding list of text segment data structures,
   wherein each media segment data structure represents a media segment and comprises:
      data indicative of a type for the media segment, indicating an origin of any sound for the media segment,
      data indicative of a list of video clips for the media segment, and
      wherein the types of each media segment include script, sound on tape (SOT) and voice, and wherein SOT and voice segments each include a list of timing control elements that determine the length of the media segment, and wherein video clips attached to the media segment are automatically trimmed to fit the length of the media segment; and
   wherein each text segment data structure comprises data indicative of text associated with the corresponding media segment; and
   a processor connected to the computer memory,
   wherein the processor reads the data structure from the computer memory and causes a display to display a representation of the story; and
   wherein the processor receives instructions through an input device from a user to edit the story.

5. The video editing system of claim 4, wherein the processor is further configured to convert the story into a sequence including a video track and a plurality of audio tracks of different types, wherein each clip in each segment is transformed into a span on a track.

6. The video editing system of claim 5, wherein a video clip in a the list of video clips may be designated as an automatic trim-to-fit video clip, whereby the processor, when converting the story into a sequence, automatically trims the video clip to fit a length of the media segment that includes the video clip.

7. The video editing system of claim 6, wherein the length of the media segment is determined according to script text from a text segment corresponding to the media segment.

8. The video editing system of claim 5, wherein audio levels are automatically ducked among different types of audio tracks.

9. The video editing system of claim 5, wherein spans on audio tracks are automatically created when a video clip specifies that corresponding audio tracks are to be used.

10. The video editing system of claim 5, wherein spans on video tracks are automatically created using video corresponding to an audio clip when the video track is empty in a region corresponding to a span on the audio track for the audio clip.

11. The video editing system of claim 4, further comprising input audio track mappings wherein an audio track in source material is designated as a type of audio track, and output audio track mappings wherein an audio track in an output sequence is designated as a type of audio track, and wherein the processor permits an editor to select audio according to a type of audio track in which the selected audio will be placed.

12. The video editing system of claim 4, wherein the processor permits the user to extend a clip from one segment into an adjacent segment.

13. The video editing system of claim 4, wherein the processor permits the user to split a segment.

14. The video editing system of claim 4, wherein the processor determines an estimated time for reading script of a text segment.

15. The video editing system of claim 14, wherein the processor determines a difference between the determined estimated time and a duration for the list of video clips of a media segment corresponding to the text segment, and displays the determined difference.

16. The video editing system of claim 14, wherein the processor permits a user to designate that a video clip should be automatically tried so that the duration of the list of video clips of the media segment matches the determined estimated time of the corresponding text segment.

17. The video editing system of claim 4, wherein the processor determines a difference between a duration for a list of timing control elements and a list of video clips for a media segment, and displays the difference.

18. The video editing system of claim 17, wherein the processor permits a user to designate that a video clip should be automatically trimmed so that the duration of the list of video clips of the media segment matches the duration of the list of timing control elements of the media segment.

19. The video editing system of claim 4, wherein the displayed representation of the story comprises an arrangement of nonoverlapping representations of a plurality of the segments in an order according to the sequence and wherein the representation of each of the displayed segments comprises a portion of the audiovisual information for the segment displayed adjacent to the related text for the segment.

20. A video editing system comprising:
    a memory device, including a data structure stored in the memory device, wherein the data structure represents a story as a list of media segment data structures and a corresponding list of text segment data structures,
    wherein each media segment data structure represents a media segment and comprises:
        data indicative of a type for the media segment, indicating an origin of any sound for the media segment,
        data indicative of a list of video clips for the media segment, and
        wherein the types of each media segment include script, sound on tape (SOT) and voice, and wherein SOT and voice segments each include a list of timing control elements that determine the length of the media segment, and wherein video clips attached to the media segment are automatically trimmed to fit the length of the media segment, and
    wherein each text segment data structure comprises data indicative of text associated with the corresponding media segment; and
    a processor connected to the memory device
    wherein the processor is configured to read the data structure representing the story from the memory device and to generate and store a representation of the story in a document in a markup language, wherein the document includes markup elements that include a representation of the list of media segments from the story.

21. The video editing system of claim 20, wherein the processor is configured to display a representation of the story, wherein the displayed representation of the story comprises an arrangement of nonoverlapping representations of a plurality of the segments in an order according to the sequence and, wherein the representation of each of the displayed segments comprises a portion of the audiovisual information for the segment displayed adjacent to the related text for the segment.

22. A video editing system comprising:
    a memory device, including a data structure stored in the memory device, wherein the data structure represents a story including a list of text segment data structures wherein each text segment data structure comprises data indicative of script text and an associated list of media segment data structures, wherein each media segment data structure represents a media segment and comprises:
        data indicative of a type for the media segment, indicating an origin of any sound for the media segment,
        data indicative of a list of video clips for the media segment, and
        wherein the types of each media segment include script, sound on tape (SOT) and voice, and wherein SOT and voice segments each include a list of timing control elements that determine the length of the media segment, and wherein video clips attached to the media segment are automatically trimmed to fit the length of the media segment;
    a processor connected to the memory device;
    wherein the processor is configured to read the data structure from the memory device and to extract the list of media segments from the story; and
    wherein the processor is configured to convert the list of media segments into a sequence including a video track and a plurality of audio tracks of different types, wherein each video clip and each timing control element in each segment is transformed into a span on a track.

23. The video editing system of claim 22, wherein the processor is configured to display a representation of the story, wherein the displayed representation of the story comprises an arrangement of nonoverlapping representations of a plurality of the segments in an order according to the sequence and, wherein the representation of each of the displayed segments comprises a portion of the audiovisual information for the segment displayed adjacent to the related text for the segment.

* * * * *